US006609840B2

United States Patent
Chow et al.

(10) Patent No.: US 6,609,840 B2
(45) Date of Patent: Aug. 26, 2003

(54) WAVE LENGTH ASSOCIATIVE ADDRESSING SYSTEM FOR WDM TYPE LIGHT PACKET STEERING

(75) Inventors: Alan Y. Chow, 191 Palamino Pl., Wheaton, IL (US) 60187; Vincent Y. Chow, Hanover Park, IL (US)

(73) Assignee: Alan Y. Chow, Wheaton, IL (US)

(*) Notice: Subject to any disclaimer, the term of this patent is extended or adjusted under 35 U.S.C. 154(b) by 37 days.

(21) Appl. No.: 09/828,337

(22) Filed: Apr. 5, 2001

(65) Prior Publication Data

US 2002/0145776 A1 Oct. 10, 2002

(51) Int. Cl.[7] .............................. H04J 4/00; H04J 14/02; H04J 14/00
(52) U.S. Cl. ........................... 398/102; 398/47; 398/51; 398/53; 398/54; 398/77; 398/79; 398/82
(58) Field of Search ................................ 359/124, 115, 359/117, 119, 127, 128, 139

(56) References Cited

U.S. PATENT DOCUMENTS

| | | | |
|---|---|---|---|
| 4,652,079 A | 3/1987 | Shaw et al. | 350/96.15 |
| 4,890,893 A | 1/1990 | Smoot | 350/96.15 |
| 5,018,130 A | 5/1991 | Suzuki et al. | 370/1 |
| 5,367,586 A | 11/1994 | Glance et al. | 385/24 |
| 5,402,256 A * | 3/1995 | Spanke | 359/140 |
| 5,675,428 A | 10/1997 | Henmi | 359/161 |
| 5,734,486 A * | 3/1998 | Guillemot et al. | 359/139 |
| 5,739,934 A | 4/1998 | Nomura et al. | 359/124 |
| 5,959,753 A | 9/1999 | Duling, III et al. | 359/158 |
| 6,064,507 A | 5/2000 | Heflinger et al. | 359/237 |
| 6,072,612 A | 6/2000 | Liou et al. | 359/123 |
| 6,160,649 A | 12/2000 | Horiuchi et al. | 359/110 |
| 6,160,651 A | 12/2000 | Chang et al. | 359/124 |
| 6,201,234 B1 | 3/2001 | Chow et al. | 250/214 |
| 6,271,946 B1 * | 8/2001 | Chang et al. | 359/124 |

* cited by examiner

Primary Examiner—Leslie Pascal
Assistant Examiner—M. R. Sedighian
(74) Attorney, Agent, or Firm—Mayer, Brown, Rowe & Haw

(57) ABSTRACT

A system and method are disclosed for carrying additional information data on multiplexed signals which are modulated on different wavelengths. An information code such as an address or control data for a particular data signal at a selected wavelength is overlaid on the parallel multiplexed signals. The information code may be overlaid by attenuation or changing the amplitude of the different signals. A separate marker channel at a separate wavelength is also multiplexed with the data signals to indicate the presence of an information code. An optical data detector array is used to optically determine the encoded address by comparing the signals with light levels and producing an output when a matching code is detected. The optical data detector array uses a series of detectors each corresponding to the wavelength of light signals carrying the information data. The detectors each have two photo detectors which are wired in parallel with each other to produce a voltage output when different light levels are detected on the two photo detectors. Using the information codes, an optical buffer may be realized which allows true optical switching of a data signal on detection of a matching information code. Alternatively, optical signals may be cross connected to balance data traffic through a fiber optic cable.

23 Claims, 17 Drawing Sheets

WAVE LENGTH ASSOCIATIVE ADDRESSING SYSTEM FOR WDM TYPE LIGHT PACKET STEERING

FIELD OF INVENTION

This invention relates to a method and apparatus for embedding transparent action and addressing information directly onto optical data packets for optical transmission. More particularly, the invention relates to an overlay encoding scheme, which is carried on other optical data packets in WDM type transmission channels to produce a parallel data word or a serial header code which steers the data packets.

BACKGROUND OF INVENTION

The use of digital modulation to transmit large amounts of data such as audio, video, voice, graphical and other media has created the need for a reliable and rapid data carrier means. Large amounts of information are now transmitted over the Internet, which has proven a cost effective and ubiquitous medium for data exchange. In its inception, the Internet was based on telephonic communications, which were in turn based on wire connections and electrical switching. The great amount of digital data used by multimedia has required the use of higher capability and higher speed transmission media. Fiber optic cable has proven to be an ideal backbone for the Internet because it has a large bandwidth and may carry much more data than wire cable. The theoretical capacity of a single optical fiber is vast, on the order of 25 Terahertz (1,000 Gigahertz=1 Terahertz). Today, optical fiber capacity is nearing this Terahertz range driven by unprecedented growth in the Internet that is doubling every 10 months.

The Internet uses an address protocol which requires data to be assigned addresses and divided into different packets. The data packets are then routed through the communications network to a receiving medium which has the assigned address destination. Such data transmission may take place over thousands of miles and requires numerous devices, termed routers, which function to route data traffic to the correct destination according to its addresses.

Currently the telephone communications network has an optical layer with a backbone network of high speed fiber optic cables. The optical layer is a conglomeration of numerous data signals carried long distances by cables arranged in ring and mesh topologies. The optical layer interfaces with an electronic layer of local inputs and outputs of digital information. The electronic layer uses digital switches and electronic add/drop multiplexers to route electronic signals converted from optical signals or to convert electrical signals to optical signals.

The high end of the optical spectrum standard for fiber optics is currently OC-192, which allows data bit rates of 10 gigabits per second per channel. The OC or Optical Carrier standards are incremental increases in data rates relative to OC-1 at 51.84 Mbits/sec. The current levels of OC-1, OC-3, OC-12, OC-48 and OC-192 are specifically at 51.84 Mbits/sec, 155.52 Mbits/sec, 622.08 Mbits/sec, 2.48832 Gbits/sec, and 9.95328 Gbits/sec (or 10 Gbits/sec for simplicity). Previously, data had been transmitted through fiber optical cable using time division multiplexing ("TDM") which sends signals representing data divided by slices of time. Thus, a single optical fiber could carry only one data signal at a time. In order to increase the rate at which data was transmitted, additional fibers were added or circuitry was installed to increase the speed of data transmission.

Although light signals over fiber optic cable degrade less than electronic signals over wire cables, a series of repeaters (devices which read the incoming TDM signals and replicate them for further transmission) are necessary to maintain the signal at approximately 40 km increments.

In order to increase the capability or bandwidth of fiber optic without the attendant increase in data rates, circuitry or cables, wavelength multiplexing has been developed. This method encodes data signals in different wavelengths or WDM channels and simultaneously transmits these wavelengths (colors) through a single strand of fiber optic cable. Thus, a single optical fiber can hold in excess of 200 wavelengths in multi-channel systems such as DWDM (Dense Wavelength Division Multiplexing) or HDWDM (high density WDM). Typically, WDM covers 40 or less wavelength channels while DWDM reaches to 120 channels followed by even greater channel counts for HDWDM. In these schemes, each wavelength is independent and acts as one optical channel. One advantage of DWDM is the ability to carry more data without going to higher bit rates. This reduces many of the long-haul and signal-to-noise complexities faced by the TDM method while keeping incremental cost under control.

DWDM light transmission is typically generated by a laser diode array having one laser for each wavelength. At the receiving end, high-speed detectors such as PiN (P-Intrinsic-N), APD (Avalanche-Photo-Detector), or MSM (metal-silicon-metal) elements are matched to each DWDM wavelength/channel used. To ensure that all light wavelengths will propagate equally well in one fiber, the wavelengths must be spaced very close together to fit inside a given transmission window inherent to that fiber. For long range applications, single mode fibers are used to propagate only one wave mode. Single mode transmission offers the lowest losses and maximizes the long haul distances possible between repeater or regeneration sites. The single mode fiber transmission window is between 1528 nm to 1561 nm (C-band) and is typically referred to as the 1550 window. The large amount of data traveling over an Internet backbone route requires efficient transmission protocols that insure the reliability of the data at the greatest possible speed. Thus, an individual DWDM optical cable may carry numerous light signals on many different wavelength channels.

The fiber optic medium is robust and is naturally free from electrical and electromagnetic interference. However, even with the high data bandwidth enjoyed by fiber optics, increasing amounts of information require methods of more efficient data transmission that address the needs for data buffering and data grooming.

Previous generation optical fiber systems increased bandwidth by increasing data rates. This required repeaters units to amplify the signals every 40 km or less. DWDM with multiple channels permit operation at slower rates while increasing bandwidth. This allows repeater stations to be spaced further apart to 120 km distances. At each repeater station, optical signals are reconditioned by being reshaped, retimed and reamplified ("3-R restoration"). With DWDM, the cost of increased bandwidth is much lower than traditional TDM solutions. New wavelengths may be added at low incremental costs to match demand. Thus, DWDM allows transmission of greater data, is scalable and takes advantage of already deployed fiber.

The packets of individual optic signals must be eventually channeled to their proper destination address resulting in splitting the DWDM channel into individual data packets by demultiplexing. Routers are used to demultiplex, sort (data grooming) and then recombine optical packets into new light signals until the packets reach their intended destinations. This complex process is accomplished by first converting the light signals into electrical signals and then steering them accordingly in the electrical domain followed by a final conversion back to the light domain. Once back to light form, the signal is again launched into another fiber as the packet continues its journey. This conversion process is known as the OEO (optical-electrical-optical) and is repeated many times until a packet finally reaches its destination. High capacity data buffering plays a very important role in the OEO function since the optical signals must be held while electronic processing occurs. Conversion of data packets from one channel to another or changing the relative position of one data set to another requires sophisticated First In-First Out buffers (FIFOs) and very fast memories.

The routers may also have the ability to perform 3-R regeneration and to perform add-drop functions. At these router locations, new light data can also be injected (added) into the optical backbone or light data may be dropped at that node to service customers located in that area. In other parts of the optical network, optical add-drops and 3-R regeneration are performed as stand alone functions.

Current optical routers are heavily dependent on the OEO function. Unfortunately, this conversion adds significant delays and makes true optical packet steering extremely difficult. In most cases, steering the light signal must be accomplished in under 5 nsec to have any reasonable chance for preserving optical efficiency. OEO functions, therefore, must be minimized or eliminated in a true optical management system. In order to ensure that no optical data is lost, light buffering must be employed. Light buffering is a technique where a light packet enters a long loop of fiber to manufacture a time delay (in the nanosecond to microsecond range) to enable a supporting electrical function (such as a microcomputer) time to perform its tasks. The fiber delay loop used may extend to kilometers in length depending on the delay time required. Such optical buffering techniques are limited and do not increase system performance or replace wavelength management functions performed in the electrical domain. Thus, present systems such as the SONET (synchronous optical network) infrastructure are hybrid optical systems that must depend heavily on multiple OEO conversions to route data packets between a source and a destination.

Another delay in transmitting data using wavelength division multiplexing is the amount of time it takes for each router to correctly read the address of the packets of data. Since the DWDM method uses separate wavelength channels, each channel must be read separately in order to determine the address and thus the destination of the data. This delay is the principal bottleneck for efficient DWDM deployment and true optical packet routing.

Finally, the present methods of sending address or control codes commensurate with raw data rate speeds are inefficient and must be executed in the electrical domain. With data rates upwards of terabits present in a DWDM fiber, conventional detection techniques for address coding are forced to read all the signals in real time just to isolate a few bits of control code. This requires a terabit level engine for each fiber to perform basic signal and address code functions, rendering the approach impractical. Even if processing can be managed, the need to offload single sensor outputs with associated amplification creates many timing and phasing issues at gigabit rates when signal waveforms must be preserved to picosecond accuracies for reliable operation. These problems prevent current technology from effectively taking advantage of the power offered by light to light direct comparisons.

Thus, a need exists for a rapid light to light detector which transparently detects packet header and overlay data contents. There is a further need for an optical code detector which does not require signal conversion into an electrical medium. There is a further need for a method of addressing optical channels for rapid routing of optical signals on the fly. There is also a need for a device which allows different data signals to be added and dropped optically to efficiently route data signals. There is also a need for an optical buffer that can directly groom and route optical signals based on the steering data present in packet headers and overlay codes.

SUMMARY OF THE INVENTION

These needs may be addressed by the present invention which is embodied in an optical data decoder for detecting a data sequence from an optical signal carrying data signals at different light wavelengths and a marker wavelength signal multiplexed as a single signal. The data sequence is encoded on the different light wavelengths by modifying selected data signals. The optical data decoder has a plurality of optical detector units each corresponding to each different light wavelength carrying a data signal. Each of the optical detector units have a photo detector having an anode and a cathode, the photo detector in exposure to the data signal. A reference detector has an anode and a cathode. The anode of the reference detector is coupled to the cathode of the photo detector, and the cathode of the reference detector is coupled to the anode of the photo detector. The reference detector is exposed to the marker wavelength signal.

The invention may also be embodied in a method for transmitting a data sequence in an optical data transmission system having multiple data signals modulated on different selected light wavelengths. The multiple data signals are multiplexed into a single optical signal. A marker signal is provided which is modulated on a selected reference wavelength. Selected data signals are modified to encode the data sequence to correspond to a single selected data signal.

The invention may also be embodied in an optical router for routing data signals from an optical fiber to a selected destination. The optical fiber carries a single optical signal which has multiplexed data signals modulated at different light wavelengths, a marker wavelength signal, and a data sequence corresponding to a selected data signal encoded on the different light wavelengths of the data signals. The router has an optical buffer which has an optical data detector coupled to the optical fiber. The optical data detector has detector units which each sense light at a different wavelength and sense the marker wavelength signal. The detector produces an output indicative of the presence of a selected data sequence in the data sequence. A fiber optic delay loop holds the optical signal. A data output channel is provided. An optical switch is coupled to the optical fiber and the data channel. The fiber optic delay loop has a length sufficient to delay the optical signal for a time interval sufficient to detect the selected data code and activate the optical switch. A processor unit is coupled to the buffer and the optical switch. The processor unit reads the output of the detector of the buffer and controls the optical switch to divert the light signal to the data channel on detection of the selected data sequence.

The invention also may be embodied in an optical code detector for detecting an information code from an optical signal carried on an optic fiber. The optical signal has a header portion containing the information code encoded with different levels of light and a data portion. The optical code decoder has a plurality of optical storage devices coupled to the optical fiber. Each optical code detector stores a segment of the information code and emitting the light encoding the segment. An optical detector unit is provided for each segment of the information code and are each exposed to the segment light. The optical detector units each have a first photo detector having an anode and a cathode. A second photo detector has an anode and a cathode. The anode of the second photo detector is coupled to the cathode of the first photo detector, and the cathode of the second photo detector is coupled to the anode of the first photo detector. A light emitter array is optically coupled to the optical detector units.

The invention may also be embodied in a method for decoding information code in an optical data transmission system having a light modulated data signal having a data portion and a header containing the information code. The light signal is carried on a fiber optic cable. The information code is separated in the header into discrete light segments. The discrete light segments is determined to a predetermined pattern. A match is indicated when the predetermined pattern is the same as the discrete light segment.

The invention may also be embodied in an optical buffer for storing data signals from an optical fiber for further downstream processing. The optical fiber carries data signals at different light wavelengths and a marker wavelength signal multiplexed as a single signal, and a data sequence encoded on the different light wavelengths by modifying selected data signals. The optical buffer has an optical data detector optically coupled to the optical fiber. The optical data detector has detector units which optically sense the data sequence. The detector produces an output indicative of the presence of a selected data sequence code. A fiber optic output is provided. An optical switch has an input coupled to the optical fiber and a first output coupled to the fiber optic output, and a second output. The optical switch permits the optical signal to be routed via the first output to the fiber optic output or to the second output. A buffer fiber optical loop is coupled to the detector. The second output of the optical switch is coupled to the fiber optical loop through the second output. A processor unit is coupled to the detector and the optical switch. The processor unit reads the output of the detector and controls the optical switch to divert the optical signal to the buffer fiber loop.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
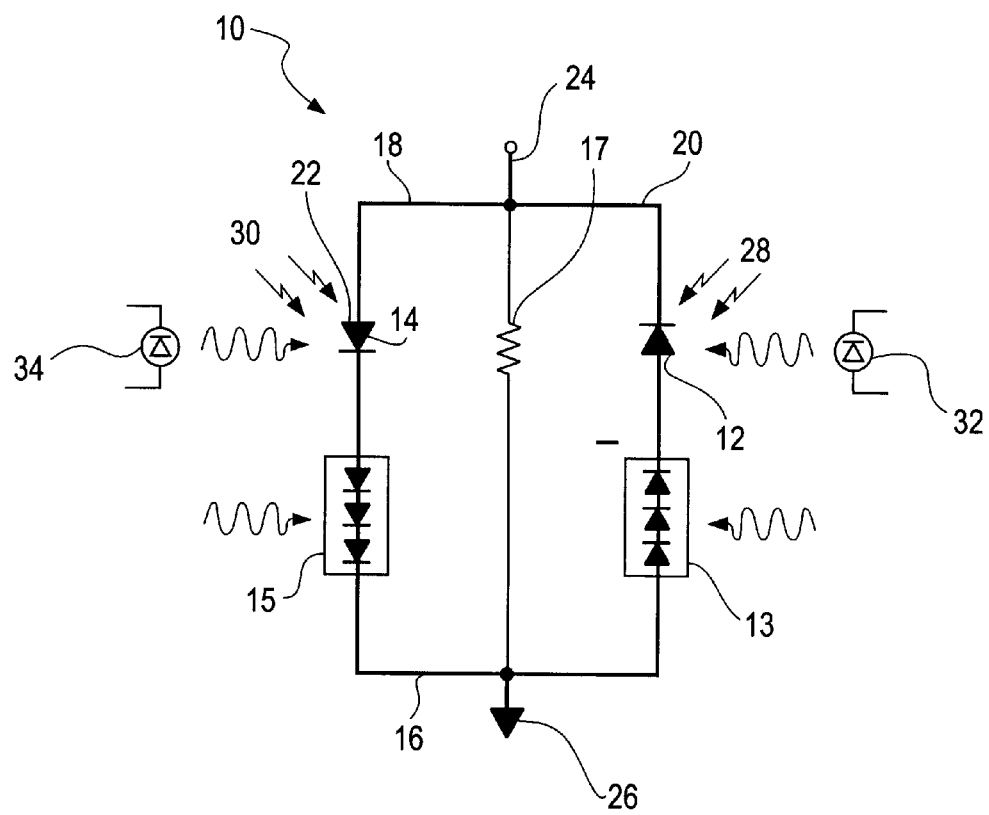
FIG. 1 is a schematic diagram of the basic optical light signal detector used by an embodiment of the present invention to detect optical information signals.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

The present invention is directed toward an optical address system and method which may be embodied in an optical coding and buffering system utilizing a bandwidth discriminating optical detector 10 shown in FIG. 1. The optical detector 10 is further described in U.S. Pat. No. 5,837,995 to the same inventors and is hereby incorporated by reference. The optical detector 10 has two photo detectors exemplified by PiN photodiodes 12 and 14, electrically connected in an inverse parallel manner such that the anode of the first photodiode 12 is electrically connected to the cathode of the second photodiode 14 via a first common conductor 16, and the cathode of the first photodiode is connected to the anode of the second photodiode 14 via a second common conductor 18.

The first photodiode 12 has a first bandwidth filter 20, and the second photodiode 14 has a second bandwidth filter 22. The first bandwidth filter 20 passes a different bandwidth of light than the second wavelength filter 22. Because each wavelength-portion filtered photodiode 12 and 14 responds only to its own specific bandwidth of light, a light source may be provided from a distant location without cross-talk interference. Instead of bandwidth filters (high, low or bandpass), a spectrometer device may be used instead to limit the light energy bandwidth reaching the photodiodes 12 and 14. This type of optical channel demultiplexing is commonly found with fiber optics telecom equipment. The term "light" is not restricted to visible light, but also include wavelengths from the far ultraviolet to the far infrared as a function of the detector type or technology used. Light wavelengths used in optical telecommunications depend on the application but generally fall within the 0.8–1 um and 1310 nm and 1550 nm windows. Photo detectors for telecommunications are typically based on group IV elements such as Silicon or group III-V elements such as Indium Phosphide (InP), Galium Arsenide (GaAs), Indium Galium Arsenide (InGaAs) and Silicon Germanium integrated circuits. Examples of other detector types include ultraviolet GaN (galium nitride) detectors, APD (avalanche photodetector), SAM APD (separate amplification multiplication avalanche photodetector), MQW (multiple quantum wells) and MSM (metal semiconductor metal) sensor elements.

The voltage phase developed by the bandwidth filter optical detector 10 is measured from the first output terminal 24 and the second output terminal 26. A first transmitter signal light source 28 at a specific bandwidth to the first photodiode 12 is represented by the arrows. A second reference light source 30 to the second photodiode is represented by the arrows. The voltage-phase polarity developed at the output terminals 24 and 26 is determined by which of the two photodiodes 12 or 14 produces a higher voltage which is dependent on the relative intensity of illumination they receive from the transmitter signal light sources 28 and 30. For example if the first photodiode 12 produces a higher voltage than the second photodiode 14, then the voltage phase measured from the first output terminal 24 relative to output terminal 26 will be negative and the voltage-phase from the second output terminal 26 will be positive relative to output terminal 24. In contrast, if the voltage from the second photodiode 14 is greater than the voltage from the first photodiode 12, then the voltage-phase measured from the first output terminal 24 relative to output terminal 26 will be positive and the voltage-phase measured from the second output terminal 26 relative to the output terminal 24 will be negative. Thus, if the two photodiodes 12 and 14 are similar or as identical as possible, the voltage-phase from the output terminals 24 relative to the output terminal 26 or vice versa is controlled by relative intensity of illumination of the two photodiodes, i.e. changes in the relative illumination from transmitter signal light sources 28 and 30 to the two photodiodes 12 and 14.

The voltage output may be biased by means of a light emitting diode (LED) or a vertical cavity surface emitting laser (VCSEL) or an equivalent light source with a controlling aperture focused on either the photodiode 12 or the photodiode 14. A LED is focused on the photodiode 12. When power is directed to the LED 32, the photodiode 12 is biased to a voltage which depends on the intensity of the LED 32. Correspondingly, a LED 34 is focused on the photodiode 14 and causes the photodiode 14 to be biased to a voltage which depends on the intensity of the LED 34. In this manner, the output of the optical detector 10 may be prebiased with any offset voltage to match the needs of the application. Also, reverse DC bias may be added to both PiN devices as is well known in the art to increase photodetector response speed. The reverse bias may be accomplished by coupling optional reverse bias elements such as DC voltage sources 13 and 15 in series with the photodiodes 12 and 14. The voltage sources 13 and may preferably be photovoltaic devices which use a light input to generate a specific voltage.

Additionally, an optional load resistor 17 may be coupled in parallel to the photodiodes 12 and 14. The load resistor 17 is desirable when the photo detectors such as photodiodes 12 and 14 are reverse biased as described above in order to nullify noise currents which may result in output voltage drift away from 0 volts. When light intensities are not equal across the photodiodes 12 and 14, the load resistor 17 serves to limit the voltage swings (prevents forward biasing of the photodiodes) detected across the output terminal 24. This insures that response speed is maximized. The value of the load resistor 17 is sized to the application to yield a maximum voltage signal while preserving response speed and preventing noise voltage effects. This value may typically range from 50 ohms to 1 Mega ohms depending on the application. A load resistor is necessary in detectors which are cascaded as will be explained below.

Figure 2:
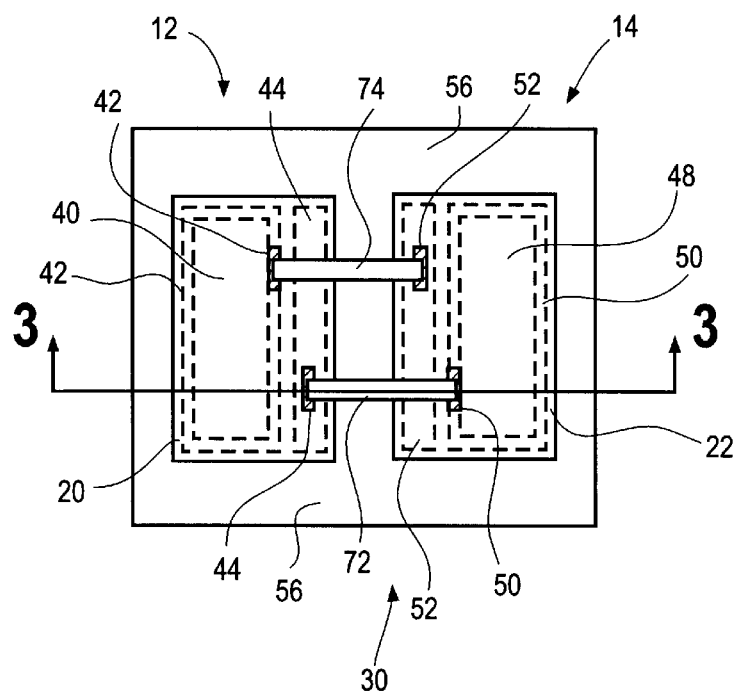
FIG. 2 is a top view of an integrated circuit layout of the basic PiN optical light signal detector used by an embodiment of the present invention.
Figure 3:
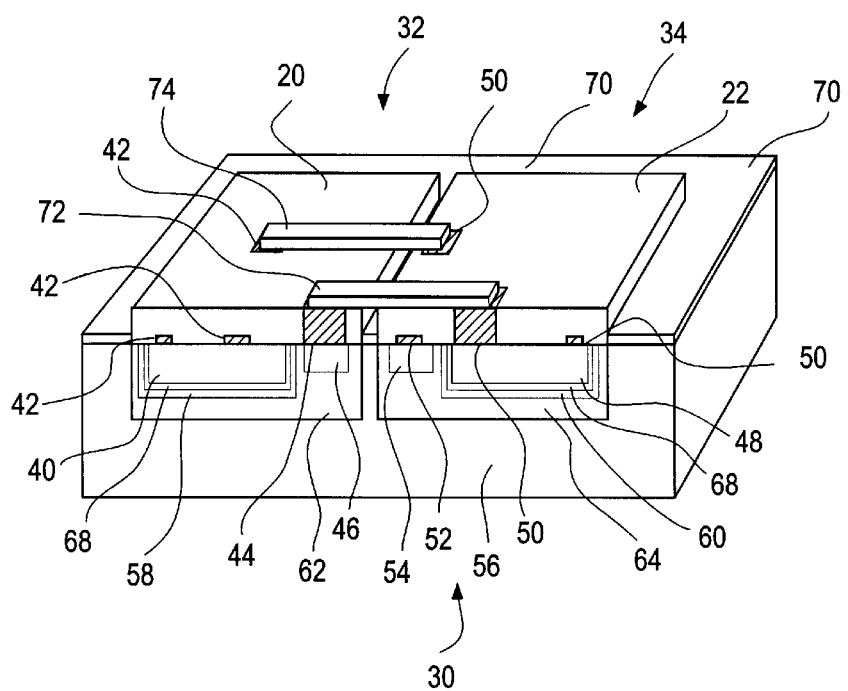
FIG. 3 is a cutaway view of the integrated circuit layout of the basic PiN optical detector used by an embodiment of the present invention along the line 3–3' in FIG. 2.

Preferably, as shown in FIGS. 2–3, the bandwidth filter optical detector 10 is constructed as a monolithic integrated circuit on a silicon substrate with conventional doping methods. Of course other integrated circuit materials and fabrication techniques may be used. The two PiN photodiodes 12 and 14 are fabricated along with the first bandwidth filter 20, and the second bandwidth filter 22. A P+ surface 40 of the first photodiode 12 has an anode 42 deposited around the entire edge of the P+ region 40. The first photodiode 12 has a cathode 44 which is deposited completely over a large area of an N+ region 46. The anode 42 and the cathode 44 may be fabricated from metal as will be described below. Similarly a P+ region 48 of the second photodiode 14 has an anode 50 deposited around the entire edge of its P+ region 48. The second photodiode 14 has a cathode 52 deposited completely over a large area of an N+ region 54. A starting P-type silicon substrate 56 is shown surrounding the two photodiodes 12 and 14. Although the starting monolithic silicon substrate 56 for the illustrated preferred embodiment of the bandwidth filter optical detector 10 of the present invention is undoped silicon, those skilled in the art will recognize that P-type or N-type silicon may also be use as a starting monolithic silicon substrate by altering the fabrication of the photodiodes 12 and 14.

Additionally, other semiconductor materials such as gallium arsenide may be used for the integrated circuit fabrication. A gallium arsenide PiN diode is fabricated as described above, except the starting semiconductor material is GaAs. As is known in the art, different N+ dopant materials such as Si, S or Fe and different P+ dopant materials such as Be, Zn, C, Mg or Mn may be used. Separation areas between PiN devices may be optimized with trench isolation and other techniques known in the art. Interconnection between PiN devices may be based on Ti/Au metallization. The wider bandgap of GaAs materials is best matched at 1.55 um while visible range operation is optimized using silicon based detectors. Other semiconductor systems that are similar to silicon based circuits include InGaAs and InGaAsP structures. Fabrication of the PiN detector structures may also be accomplished with epitaxial techniques such as chemical vapor deposition (CVD) and molecular beam epitaxy (MBE), both well known in the art.

As illustrated in FIG. 3, the construction of the wavelength filter optical detector follows standard semiconductor fabrication processes. The photodiodes 12 and 14 each have a distinct intrinsic layer 58 and 60, respectively, which are used in this embodiment because of their wider depletion region and higher switching speeds. A first heavily doped N-region 62 and a second heavily doped N-region 64 are fabricated in close proximity to each other in the starting undoped substrate 56. The N+ regions 46 and 54 are then fabricated in the first N-region 62 and the second N-region 64 respectively. A first heavily doped P-region 66 and a second heavily doped P-region 68 are then fabricated in the first N-region 62 and second N-region 64 respectively. The intrinsic layer 58 then forms at the junction of the P-region 66 and the N-region 62. The intrinsic layer 60 then forms at the junction of the P-region 68 and the N-region 64. The P+ region 40 is then fabricated in the heavily doped P-region 66 and the P+-region 48 is then fabricated in the heavily doped P-region 68. A metallic layer which forms the anode is deposited on the P+ region 40 on its perimeter to permit a large area of electrical contact and also forms the anode 50 deposited on the second P+ region 48 on its perimeter to permit a large area of electrical contact. The metallic layer also forms the cathode 44 which is deposited on the entirety of the N+ region 46 to permit a large area of electrical contact and the cathode 52 which is deposited on the entirety of the N+ region 54 to permit a large area of electrical contact. The use of a thin metal layer such as aluminum can be used anywhere on the photodiode surface pattern where blocking incident light is desirable. This custom patterning can be used to tune the relative sensitivities of each element thereby producing different optical strengths between the first and second diode elements of a diode pair.

The first wavelength filter 20, which in the preferred embodiment is a multilayer dielectric layer, is deposited on the first photodiode 12. The second wavelength filter 22, which in the preferred embodiment is a multilayer dielectric filter, is deposited on the second photodiode 14. The filter layers 20 and 22 each pass a different bandwidth of light. In the preferred embodiment for example, the first filter layer 20 has a bandwidth pass of one ITU wavelength (International Telecommunications Union) with a 0.39 nm window (50 Gigahertz spacing) between the wavelengths of 1528.77 nm (196.10 GHz) and 1560.61 nm (192.10 GHz) where 81 DWDM channels have been defined based on the ITU-T C-band G.692 standards. With DWDM specifications, this 31.84 nm window is filled with many more wavelength channels at much closer spacings. At 20 Gigahertz spacing, 202 optical channels are possible. The second filter layer 22 has a bandwidth pass window at a different ITU-T wavelength. Of course, other bandwidths, both greater and smaller, may also be used.

A silicon dioxide insulating layer 70 is fabricated on the areas of the substrate 56 not covered by the filter layers 20 and 22. Openings are etched in the filter layers 20 and to expose the anodes 42 and 50 and cathodes 44 and 52. A first common conductor 72 is then deposited to connect the cathode 44 of the first photodiode 12 to the anode 50 of the second photodiode 14. The second common conductor 74 is deposited to connect the anode 42 of the first photodiode 12 to the cathode 52 of the second photodiode 14. The common conductors 72 and 74 also serve as the output terminals 16 and 18 shown in FIG. 1.

The optical detector 10 forms the basis of an optical buffer and optical code detector by allowing fast reading of light signals at specific wavelengths which are determined by the first wavelength filter 20. As will be described below, a unique combination of direct optical packet header codes with an overlay coding scheme permit the construction of an array of optical code detectors, based on the optical detector 10, that enable packet specific destination, control or action codes, also in light form, to be interleaved into DWDM (dense wavelength division multiplexing) optical channels without disruption to normal data flow. The end result is an optical buffer that may rearrange optical packets within a DWDM fiber in any transmission order by using packet specific codes synchronized to the leading edge of individual data packets.

Figure 4:
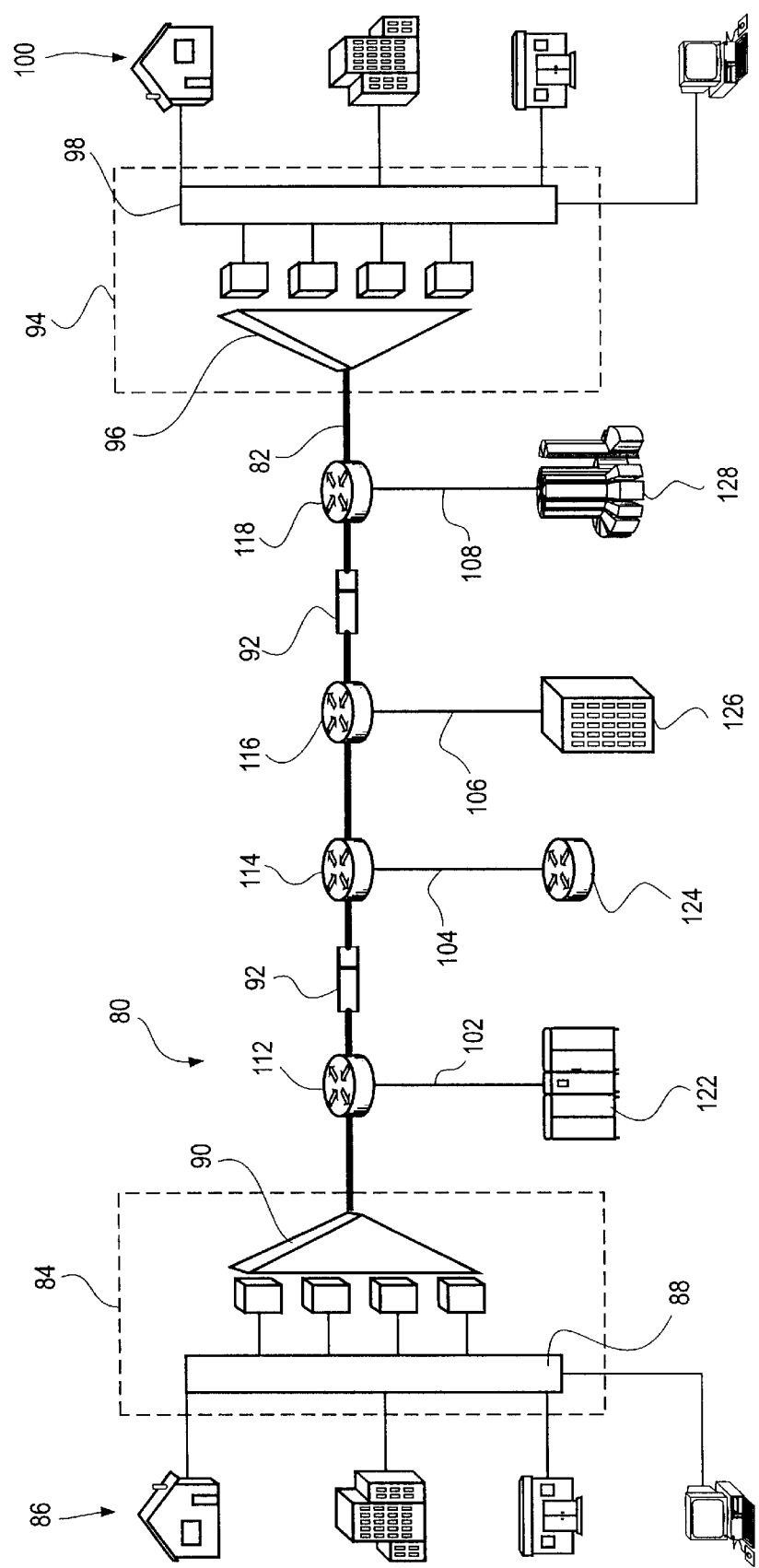
FIG. 4 is a diagram of a fiber optic data transmission network incorporating the address scheme and optically buffered routers of an embodiment of the present invention.

FIG. 4 shows a diagram of a typical data transmission network 80. The backbone of the data transmission network 80 is a fiber optic cable 82 using dense wavelength division multiplexing ("DWDM") for data transmission. In ten DWDM channels of the fiber optic cable 82, for example, up to 100 gigabits/second of data can be transmitted. Of course higher data rate capabilities may be achieved by adding more wavelengths (colors). Data is sent on the fiber optic cable 82 from a DWDM terminal 84 in the form of multiplexed light signals at different wavelengths for each data channel. As the light signals at all wavelengths travel down the optic fiber 82 down a typical span, the wavelength (colors) will propagate at slightly different speeds but the propagation differences are a function of the dispersion coefficient in the fiber type used. This error may be reduced or eliminated by using low dispersion fiber or by inserting short compensating fiber segments into all DWDM channels during demultiplexing. The effect of compensation is that all wavelengths will reach the destination point at about the same lime. The practical limit for fiber spans is around 100 km because various forms of cascaded distortions are manifested at the bit level that will degrade an eye diagram for a given bit rate. An eye diagram is a visual tool produced by random logic data showing the ease for separating ONE and ZERO bits by a receiver receiving this data at the end of a fiber span.

The DWDM terminal 84 is connected to data sources 86 which may represent voice, computer, video or other forms of digitally modulated data. The data signals from the data sources 86 are connected to a transponder interface 88 which converts the data into light at different wavelengths for transmission. Each of the different signals from the transponder interface 88 are then connected to an optical multiplexer 90 which combines the signals for transmission along the fiber optic cable 82. A series of optical signal amplifiers 92 are spaced along the fiber optic cable 82 to amplify the light signals and insure signal reliability by 3-R regeneration.

The data may be ultimately received by a second DWDM terminal 94 which represents a large number of users at an end destination. The signals from the fiber optic cable 82 are connected to an optical demultiplexer 96 which separates the different data signals into different wavelengths. The data signals are then connected to a transponder interface 98 which translates the optical signals into electronic data signals to the destination receivers 100 which may be phones, computers or any other digital data demodulation device. There may be a number of different destinations for data transmitted over the fiber optic cable 82 which are represented by a series of trunk lines 102, 104, 106 and 108. The trunk lines 102–108 are connected to the fiber optic cable 82 via a series of routers 112, 114, 116 and 118 respectively. The trunk lines 102–108 may be additional fiber optic cables or wire cables. The trunk lines 102–108 lead to data sources 122, 124, 126 and 128 respectively, which may be additional routers, separate computer networks or any other type of data transmission/reception source.

At each router 112–118 the wavelength data channels may be processed in many different ways. For example, each of the routers 112–118 may contain optical amplifiers in the same manner as optical amplifier 92 in order to boost the optical signal. The router 112 performs an add-drop function where specific light data packets can be "dropped" from an optical wavelength channel of the optical fiber 82. These light data packets are dropped because they may be sent to a destination such as data source 122 via trunk line 102 by the router 112. At the same time, new optical information is "added" from other data sources to refill this empty bandwidth by the router 112.

Another important function is a cross-connect switch which is performed by router 114 where data from any input channel may be routed to one (or more) of the different data channels on the fiber optical cable 82. The router 114 may also cross connect the optical channel to other destinations such as to a computer, a wire cable or a second fiber optic line represented by the trunk line 104. Many fiber backbone architectures are built around ring or mesh networks. This allows an optical signal to be cross connected to travel along an alternate path in the event of severing a fiber or a planned service detour.

The present invention takes advantage of the presence of multiple light wavelengths (or light channels) traveling down the optical fiber at near-constant speeds. When new data is added to an optical fiber such as at a router (e.g. routers 112, 114, 116 or 118) or data destination (DWDM terminals 84 and 94), a special code is also added to selected channels or all the channels without affecting data content. This special overlay code may provide optical packet steering information and other real time information for short path travel of the optical packet such as from one upstream node to the next downstream node.

Figure 5:
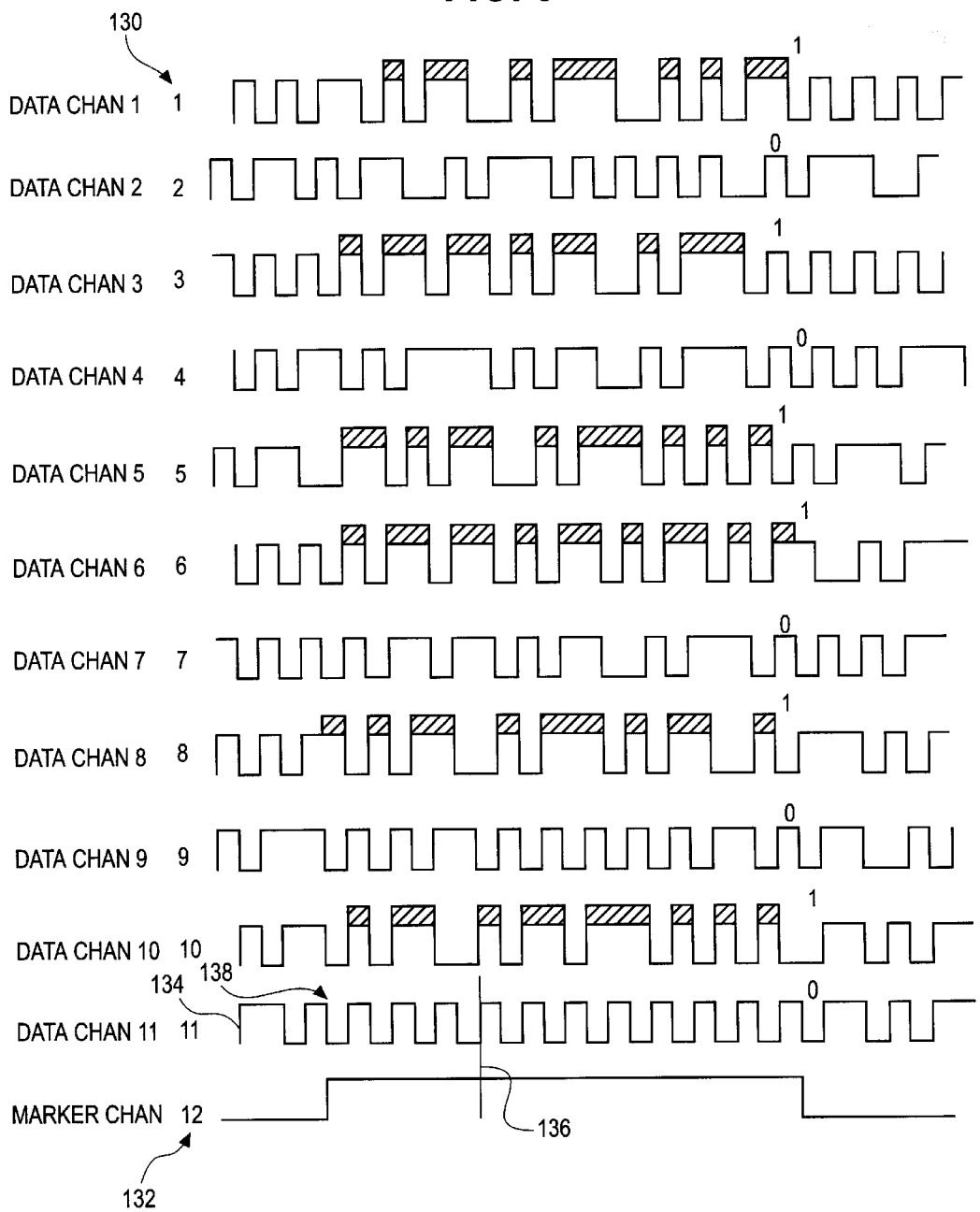
FIG. 5 is a diagram of the data channels with address code bit values on the parallel channels used by an embodiment of the present invention.

FIG. 5 is a waveform diagram of the coding technique used for optical processing which will be explained below. Each of the waveforms in FIG. 5 represent different data channels 130 which are encoded at different light wavelengths carried by the fiber optic cable 82 in FIG. 4. By way of example, the data channels 130 are designated channels 12 in FIG. 5 and represent data packets which are modulated at different light wavelengths. In practice, there may be many more data packets depending on the number of distinct wavelengths which may be multiplexed using the DWDM method. In this example, data channel 11 is the channel of interest and has coding such as traffic data carried by itself and the other data channels 1–10. Thus, the address code is 11 bits in this example. An additional marker channel 132 indicates the presence of a code overlaid across the data channels 130. The 11 bits of code in this example contains directive information only for channel 11 but multiple channels can also be simultaneously directed with one code word if the respective start points of such channels are properly matched in time.

The overlay code may be coded by either gain or attenuation encoding on the data channels 130. In positive gain encoding shown in FIG. 5, the ONE bits of optical data are encoded by a slight gain increase in that particular optical channel. In negative attenuation encoding, ONE bits are encoded by slight attenuations of that particular optical channel. ZERO bits are encoded by not modifying the gain of a specific optical channel in either method. The choice of positive or negative encoding means is determined by the hardware set available at a node. The marker channel 132 is a special optical channel reserved for carrying a synchronous pulse that corresponds to the leading edge of the specific optical data packet being encoded.

The number of DWDM channels provide the bit length of each code. Greater bit width "words" may be carried with more DWDM channels. For example, a 40 channel DWDM system, may be divided as five 8-bit words with 256 combinations per word. This single 40 bit long-word is synchronized by the marker channel and may include steering directives which support one or multiple channels. Each DWDM channel is encoded with a ONE or ZERO bit using gain or attenuation encoding as explained above but all of the encoding is synchronized by the marker channel. The gain and attenuation encoding techniques take advantage of unused bandwidth and unused correlation between DWDM optical channels. The presence of a marker channel permits synchronous detection and overlay encoding of all DWDM channels.

This synchronization also permits multiple words to be detected in a serial manner. Thus, when there is a high number of DWDM channels, a single parallel word will be sufficient to convey all steering directives for one or more DWDM channels. As optical channel counts decrease, a serial approach is used to convey multiple bits in the leader or header string to preserve steering and address information. A combination of serial and parallel encoding may be used, depending on the detail of address encoding required. Multiple word capability such as the word divided into five 8-bit parts explained above may be used to convey unrelated data such as control or action commands in parallel. The first and second data words, for example, may carry the encoding method used (gain or attenuation), channel number(s) to be steered and the action desired at the next add-drop node. The third through fifth words may carry system performance information, protection recovery information and source address data. With this capability, optical packets can carry steering and address information similar to IP packets on the Internet (transparent transmission of steering and control directives between nodes of fiber spans) while preserving the reliability of the SONET (synchronous optical network) system.

As shown in FIG. 5, the optical coding on parallel channels is accomplished using a gain shift technique. Depending on the location in the fiber optic network, not all DWDM channels may be required to perform the necessary address encoding. Once a channel is included in the coding, the overlay data is sufficiently long in duration to ensure proper bit encoding onto channels even when there is quiet traffic. By telecom standards, a quiet channel still has a minimum level of light activity necessary to maintain the proper bias and operation of telecom receivers. To ensure that all ZERO bits are never transmitted, data codes are designed to follow the 4B/5B or 8B/10B encoding standard. The 4B/5B approach encodes 4 bits of data or 16 combinations using bits of light to ensure that all-zero codes can never occur. The 8B/10B approach encodes 8 bits or 256 combinations using 10 bits to ensure that all-zero patterns can never occur. This standard requires one or two extra bits for a 25% bandwidth penalty.

In the example shown in FIG. 5, the data is gain encoded (vs. attenuation encoding). When a new light data packet is transmitted into the optical fiber 82 from an optical source such as the optical terminal 84 or the routers 112–118 in FIG. 4, a small positive gain shift is simultaneously induced into selected parallel optical channels 1–10 (transmitting normal data). When this gain shift (preferably less than 1 optical dB) occurs on a channel such as on channels 1, 3, 5, 6, 8 and 10, that channel will eventually be decoded as a surrogate carrier for a logic ONE bit. If no gain shift occurs as shown on channel 2, that channel will be interpreted as a logic ZERO bit. The gain shift does not occur on channels 2, 4, 7 and 9 which are thus coded as a logical bit ZERO.

Each data channel is otherwise a conventional optical data packet. For example, a data packet 134 in channel 11 is the data packet of interest. The data packet 134 has a header portion 136 which contains permanent codes such as framing, packet type (i.e. ATM, IP), source and destination, error correction, synchronization, status, addressing, identification and control codes related to the data packet in a serial format. Unlike the overlay codes, the header codes are part of the data and do not change when the packet is sent over the network. The header portion 136 precedes a data portion 138 which carries the actual data in the packet.

Just before reaching the next destination node, the optical packet in FIG. 5 enters an optical buffer loop which reads the parallel overlay code and decides if the packet should proceed directly into the add-drop node such as router 112 or a cross connect node such as router 114 in FIG. 4 or is buffered in an optical buffer loop. The buffer loop will be explained in detail below. This decision is based upon the traffic pattern into the cross connect or add-drop nodes that may require data flow management to arbitrate and prioritize multiple optical packets in different DWDM channels.

For traffic management and traffic grooming purposes, optical packets with similar final destination addresses may be converted into the same wavelength for increased routing efficiency before entering the cross connect or add-drop node. The decision to pass or groom an optical packet data is therefore encoded into the overlay data format. Once optical packets are routed into the optical buffer loop, direct transparent reading of optical packet header data determines the grooming functions within the buffer loop. This insulates the grooming functions inside the optical buffer loop from the data protocol used within different optical packets. The combination of using overlay and direct packet header data allows packet steering functions to respond to changing network conditions that are not predictable when the packet was first launched into the network. The overlay coding may be identification data which may be edited and then attached to an optical packet anywhere in the optical network flow to carry transient steering information. Light packets may thus be sorted, routed, and redirected dynamically in their journey from source to destination. The ability to integrate fixed and editable addressing into an optical packet will therefore allow it to be steered with adaptive responses as it negotiates its journey from source to destination with a minimum of OEO conversions. At receiving stations such as routers 112, 114, 118 or 120 or DWDM terminal 94 in FIG. 4, the overlay codes are refreshed with new data to guide the optical packets to their next control node. If the current station is the final destination, the packet address or control code may not need to be refreshed.

Further values of the address or control code are determined by how this packet will be distributed in the access layer. As optical packets near their final destinations and are de-multiplexed into single color wavelengths, steering directives may still benefit from reading a combination of the overlay codes together with the transparent packet header codes. Optical packets at a single wavelength use a serial form of overlay encoding. In the serial mode, overlay bits encoded onto the active optical packet are decoded one bit at a time and concatenated into control words. Simple steering directives such as add-drop, left-right, or pass-delay encoded in one bit code are easily processed. Overlay codes may be used in this manner near a data destination to provide better efficiency of data distribution and provisioning speed. The combination of serial overlay codes with packet header data will allow buffer loops to quickly achieve both of these objectives. Serial provisioning and data content manipulation are also important issues for the "last mile" solution of bringing fiber links into homes because customer specific services may all be supported inside the optical domain with minimal electronics. The serial overlay encoding technique allows low cost optical switches steered by overlay codes to provide rapid service provisioning into homes and businesses. Thus, fiber optics may be used for each user tap which is a separate add-drop node for symmetric service in both upstream and downstream directions.

Figure 6:
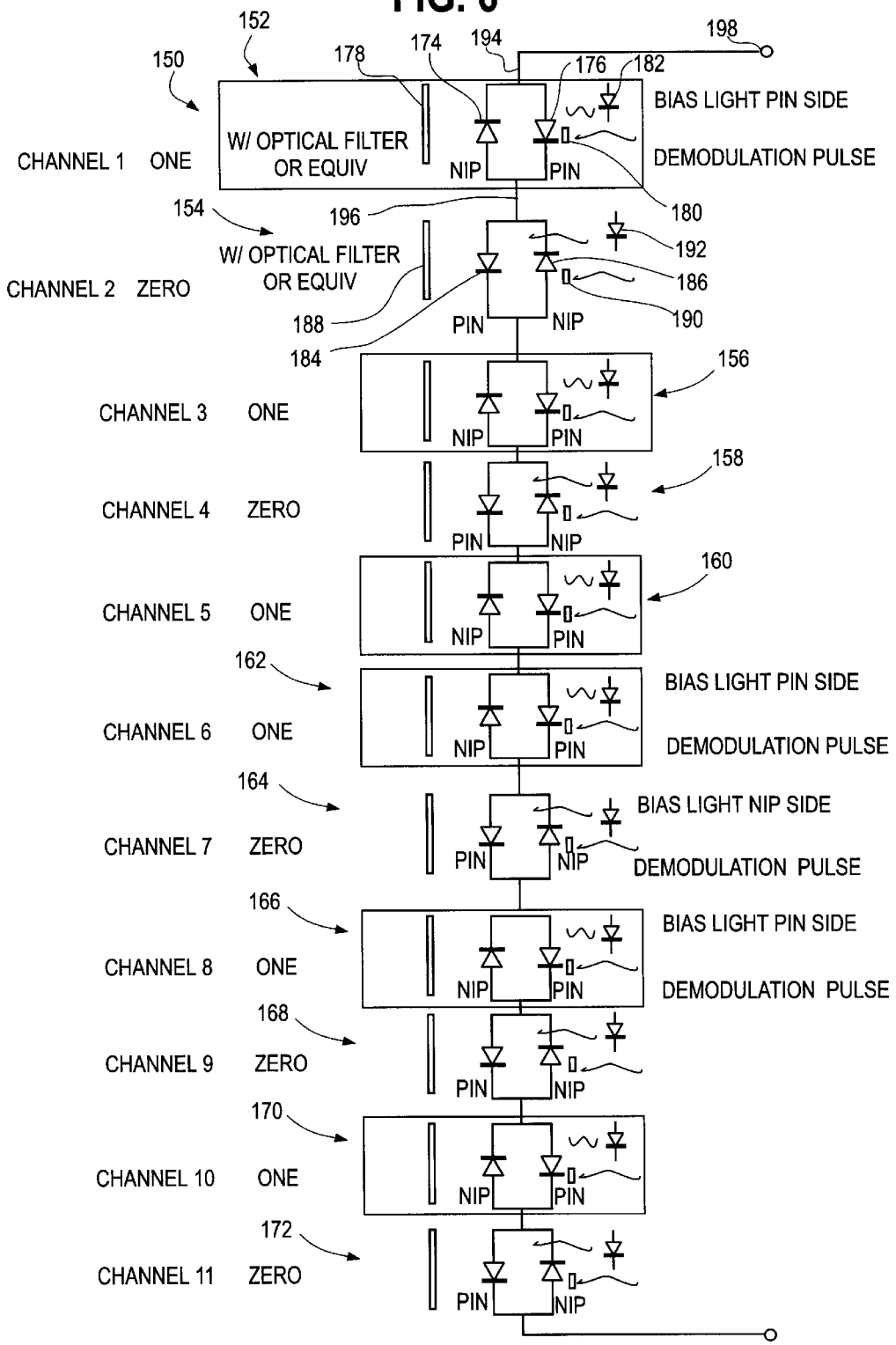
FIG. 6 is a circuit diagram of an optical code detector according to an embodiment of the present invention.

An optical address detector array 150 is shown in FIG. 6 which is constructed from basic sensor building blocks such as the optical detector 10 shown in FIG. 1. As explained above, the detectors in the optical address detector array may have load resistors similar to the load resistor 17 in FIG. 1. These components are not shown in FIG. 6 for simplicity of illustration. The optical address detector array 150 has a number of optical detector units 152, 154, 156, 158, 160, 162, 164, 166, 168, 170 and 172. Each optical detector unit 152–172 detects either a ONE or a ZERO bit. In the detector array 150, the detector unit 152 (and detector units 156, 160, 162, 166 and 170) detects a ONE bit and has a photo detector 174 which is preferably a NiP photodiode coupled to a reference detector 176 which is preferably a PiN photodiode. The photo detector 174 has an optical wavelength filter 178 which is attuned to a specific wavelength of light. The reference detector 176 has an optical wavelength filter 180 which is attuned to a second specific wavelength of light. The use of an optical filter provides wavelength selectivity but other light demultiplexing means such as gratings or spectrometers can be used to separate the incoming DWDM optical signals and direct the signals to the appropriate detector units.

In applications where reverse bias is required for increased detector response speed, each of the photodetectors 174 and 176 are a hybrid unit having two photosensitive reverse bias elements similar to the DC voltage sources 13 and 15 in FIG. 1. The first element is responsive to input light data and the second element is responsive to a bias light wavelength designed to create a reverse DC bias to the first element. The bias photosensitive element may be a cascaded array of photodiode subunits which yields several volts of reverse bias voltage as is well known in the art. Appropriate materials for this photovoltaic bias array includes silicon or amorphous silicon or wide bandgap materials such as silicon carbide.

The reference detector 176 may also be biased to a certain light intensity by a light emitter element 182 which is a light emitting diode in the preferred embodiment. Alternatively, other light emitters may be used such as a vertical cavity surface emitting laser (VCSEL) element. The wavelength of light used to create the bias level may be of any value within the detectability range of the reference detector 176.

The detector units which detect a ZERO bit such as the detector unit 154 (and detector units 158, 164, 168 and 172)

has a photo detector 184 which is preferably a PiN photodiode coupled to a reference detector 186 which is preferably a NiP photodiode.

The photo detector 184 has a wavelength filter 188 which is attuned to another specific wavelength of light corresponding to a data channel. The reference detector 186 has a reference wavelength filter 190 which is attuned to the same wavelength as the wavelength filter 180. A bias illumination element 192 for zero detection is directed at the PiN detector 184.

In logic ONE bit detection, the input channel light is focused onto the NiP detector element such as photo detector 174. In logic ZERO bit detection, the input channel light is focused on the PiN photo detector element such as the photo detector 184. Bias illumination is directed onto the appropriate element such as the reference detector 186 of detector 154 or the reference detector 176 of detector 152. The use of bias illumination may be used to ensure that non matching comparison states will always produce a positive phase error voltage. Only when a correct balance occurs between the reference and photo detectors, 174 and 176 and 184 and 186 respectively, will a null or zero volt condition be produced from the detector units 152 and 154.

Each detector unit 152–172 is tuned to the wavelength of a particular data channel corresponding, for example, to the data channels 1–11 in FIG. 5. The detector units 152–172 are wired together at their respective output terminals such as an output terminal 194 of the detector unit 152 to the output terminal of the next detector unit such as terminal 196 of the detector unit 154. The complementary end output of the array 150 has an output terminal 198 which provides an output signal. As will be explained below, each of the photodetectors of the detector units 152–172 is tuned to a particular bit value represented by the light wavelength in a corresponding channel. All of the reference detectors of the detector units 152–172 are tuned to the wavelength of the marker channel 132 in FIG. 5. If all of the channels have the proper code, a zero error signal will be output on the output terminal 198 allowing a processor to determine that the overlaid code of the particular channel matches the destination in the optical detector array 150.

Figure 7:
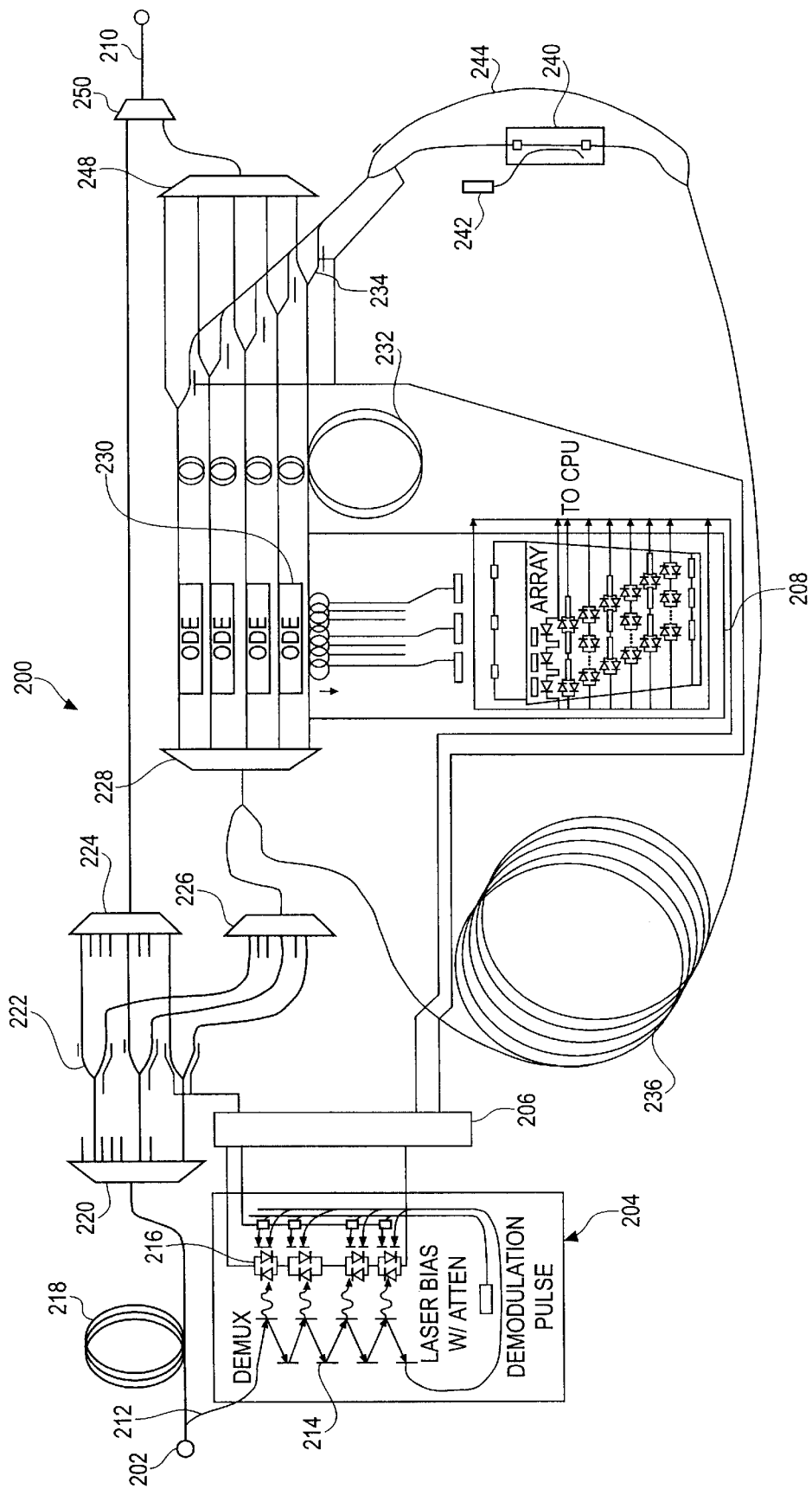
FIG. 7 is a block diagram of an optical buffer loop employing the overlay encoding scheme including the optical code detector engine for direct header packet decoding.

FIG. 7 is a block diagram of an optical buffer loop 200 that has the function of buffering optical data packets for any incoming DWDM channel on a fiber optic cable 202. An optical data packet may be held by the optical buffer loop 200 for variable lengths of time to permit proper interfacing to cross connect switches or add-drop functions. The data packet is coupled to a parallel optical code detector 204. The output from the code detector 204 is controlled by a CPU 206 which may be a specialized digital signal processor or any other appropriate processor. The individual signals are then decoded by an optical serial header decoder unit 208 which processes the signal and outputs it to an optical output 210.

The incoming signal is a DWM type signal with a code overlaid on some or all of the wavelength channels similar to the signal shown in FIG. 5. Specifically, the parallel overlay format code has a leading edge on each packet or wavelengths which contain a parallel word holding four pieces of information: 1) the wavelength channel number; 2) the packet length; 3) the amount of open bandwidth after this packet; and 4) the destination address of the packet. A small portion of the DWDM light signal is tapped from the input fiber 202 by a tap line 212 and routed to the parallel optical code detector 204. The marker channel 132 in FIG. 5 runs along normal DWDM channels and has a specific wavelength. When the marker channel light pulses are converged with the DWDM channels, encoded states of ONE and ZERO bits will immediately be processed by the sensors of the parallel optical code detector 204.

The signal is then sent into a demultiplexer 214 and is amplified if necessary and processed by an optical code detector array 216 and the supporting CPU 206. The array 216 is similar to the array 150 of FIG. 7. The output of the array 216 permits near instantaneous decisions by the CPU 206 that are synchronized to the leading edge of the optical packet related to the overlaid codes. The main signal is routed to a minimum input delay loop 218 which allows time for processing by the CPU 206.

The CPU 206 makes a decision (usually within the transmission time of the packet header) to pass the packet through to the next node such as a cross-connect node or hold the packet in the optical buffer loop 200. If two data packets are in contention for the same cross node destination, one packet is sent into the buffer loop 200 while the other is immediately passed through the output channel 210.

The data signal is passed from the delay loop 218 to a DWDM demultiplexer 220. The demultiplexer 220 separates the signal into different wavelengths which are routed to a splitter array 222. One output of the splitter array 222 is directed to a DWDM multiplexer 224. The routing of the signal after separation by the demultiplexer 220 to either the buffer loop or to immediately continue is regulated by the splitter array 222. The splitter array 222 in the preferred embodiment is composed of Indium Phosphide semiconductor optical amplifier (SOA) switches controlled by the CPU 206. The splitter array 222 allows switching on an individual wavelength basis. The other output of the splitter array 222 is directed toward a DWDM multiplexer 226 whose output signal is coupled to the stored signal and sent to a DWDM demultiplexer 228 in the header packet decoder unit 208. Each wavelength separated signal then passes through an optical serial decoder unit 230 corresponding to each different wavelength signal.

Each optical serial decoder unit 230 reads the packet header and instantaneously decodes individual optical packet header codes such as the header code 136 in FIG. 5 described in detail below. The ability to decode identification data from the header portion allows multiple packets of the same wavelength to be transmitted around the same buffer loop following a TDM protocol. The specific buffer loop length may be split into multiple segments of equal length where each segment can hold one optical packet for TDM purposes. For example, an 8 km buffer loop may be time divided to hold up to 100 packets. With knowledge of the packet window size and by triggering the optical decode unit 230, multiple packets can share the same buffer loop following a TDM protocol.

After the signals exit the decode unit 230, they are routed to a delay loop 232. The delay loop provides the necessary buffering time to interface with an optical switch. Once the decode unit 230 has detected the leading edge of a packet to be switched, the action may be executed via fast switch fabrics in nanoseconds or slower MEMs based devices in microseconds on a switch downstream. The length of delay loop 232 is adjusted to properly interface with a specific technology.

The output of each serial optical code detector 230 is merged back into the main buffer loop fiber through a SOA two-port bypass switch 234. If the active packet exiting the optical serial detector 230 is ready to reenter the output optical fiber 210, the appropriate SOA switch 234 is activated by the CPU 206 to route the optical packet out of the buffer loop 200. Optical packets held in an optical buffer fiber loop 236 are amplified once per pass through the buffer fiber loop 236 by an optical amplifier 240.

In the preferred embodiment, the optical amplifier 240 is an erbium doped optical amplifier (EDFA) which functions to increase the light levels at all wavelengths. This amplifier technology utilizes a short segment of fiber (several meters) that is heavily doped with erbium along with levels of Aluminum and Germanium. The erbium atoms are then excited or pumped by a UV laser 242 that may use one of many frequencies (514 nm, 523 nm, 667 nm, 800 nm, 900 nm or 1480 nm) to raise them to a high energy level. From this high level, the erbium atoms settle to lower metastable energy states where they will reside for several milliseconds before decaying back to the ground state (and releasing light in the 1550 nm range). During these metastable states, however, incoming wavelengths from 1520 nm to 1620 nm can trigger the energy release immediately. Due to the selectively of the metastable states, a 1540 nm wavelength, for example, will only trigger erbium atoms in states that will release amplified energy at the 1540 nm wavelength. The EDFA amplifier amplifies multiple wavelengths simultaneously while maintaining a flat gain response. As is known in the art other devices may be used for the various equalization and amplification functions.

The capacity of the optical buffer 200 is determined by the length of the buffer fiber loop 236. The length of the buffer fiber loop 236 is adjusted to match buffer requirements but may be longer. The number of wavelengths serviced by the buffer loop 236 is also scalable by changing the number of optical serial code detectors such as code detector 230. If the length of the buffer loop 236 is too short for downstream components to activate, a bypass loop 244 is provided around the optical amplifier 240 to control the number of passes through the loop 236 by a signal before amplification.

This bypass function is important to prevent unnecessary EDFA amplification which will add amplification noise too quicky to optical packet signals. Ideally, optical packets should travel the equivalent of 80 to 100 km before EDFA amplification. At OC-192 rates, 80 km of fiber may buffer around 30 Kbits of data per wavelength or around 15 optical packets at an average length of 2 Kbits each. The buffer transition time per loop passage is 400 microseconds. In a shorter loop, the buffer time delay can drop but the loop buffer capacity decreases proportionally. Optical packets released from the fiber buffer loop 236 are recombined by an output multiplexer 248. The output of the multiplexer 248 and the multiplexer 224 is merged back into the output fiber 210 through a multiplexer 250.

The buffer loop 200 allows the fiber loop 236 to buffer many DWDM channels 110 and wavelengths on a per packet basis. Since the CPU 206 has continuous updates on expected upstream traffic gaps from the detected codes, it may launch buffered packets of varying lengths back into the main fiber 210 with high efficiency. By buffering optical data with knowledge of the optical packet position within the loop, appropriate delays may be manufactured accurately to allow cross connect or add-drop equipment adequate time to set up or switch accordingly before the optic data stream reaches that node. The optical buffer 200 may be used with microsecond response cross-connect products such as the Lambda router manufactured by Lucent or the bubble array manufactured by Agilent.

Figure 8:
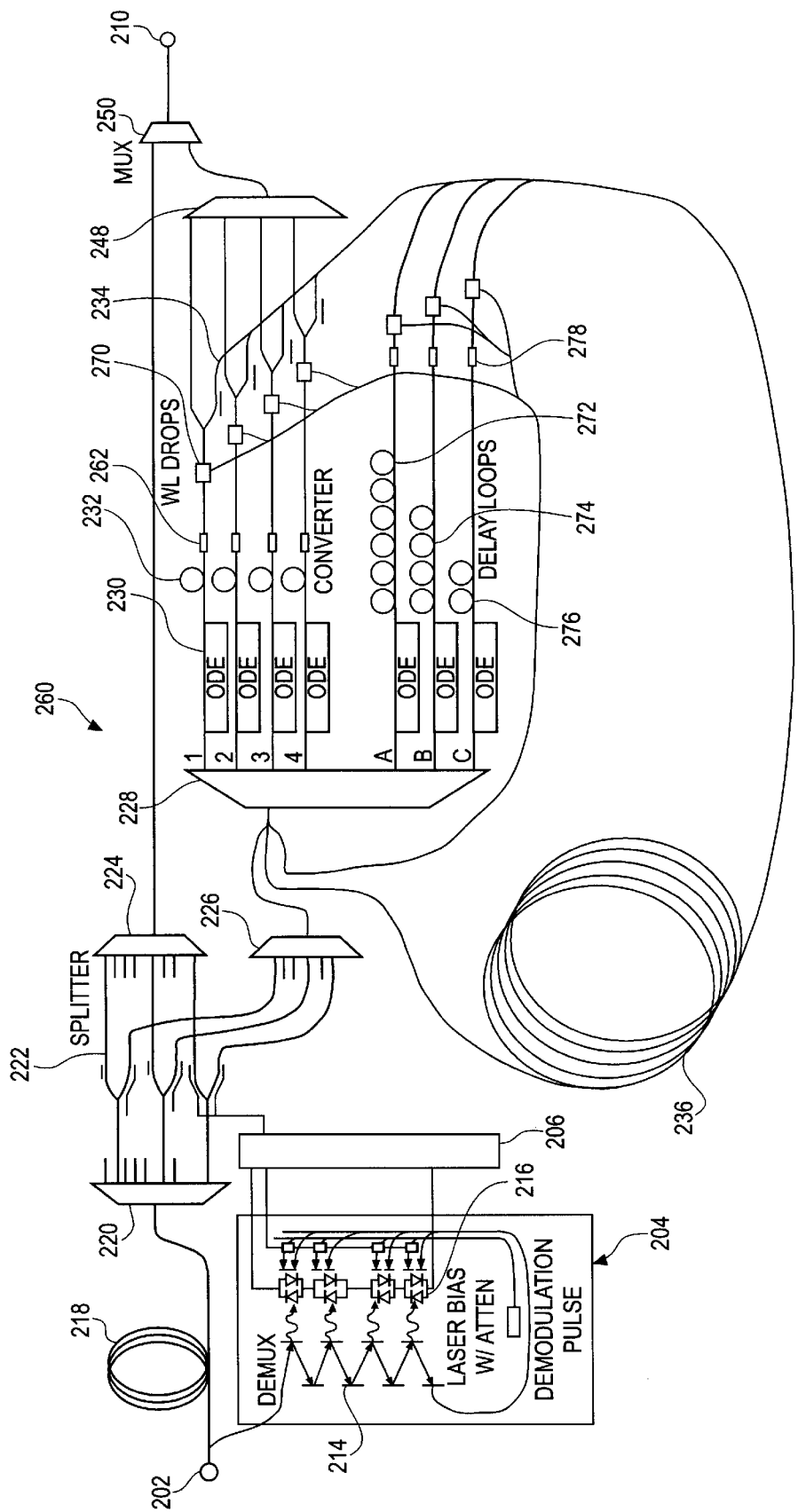
FIG. 8 is a block diagram of an enhanced optical buffer loop with wavelength conversion and packet level grooming capabilities according to an embodiment of the present invention.

FIG. 8 is an enhanced optical buffer loop 260 with wavelength conversion and packet grooming functions similar to the optical buffer loop 200 in FIG. 7 (like elements are labeled similarly as in FIGS. 7 and 8). The optical buffer loop 260 possesses the ability to regenerate overlay codes onto optical data leaving the buffer by use of wavelength amplifiers. The DWDM fiber enters from the input port 202. Similar to the optical buffer 200 in FIG. 7, the decision to pass the signal or buffer the signal is controlled by the supporting CPU 206 triggered by the parallel overlay codes detected by the parallel optical code detector 204. The input DWDM fiber is first demultiplexed by the demultiplexer 220 and sent into the switch array 222 to route the packet directly through or bypass it into the buffer loop fiber 236. If a packet is bypassed, this packet will go into a SOA element in the switch array 222 first before it is multiplexed back into one fiber by the multiplexer 226. This function allows the codes to be overlaid onto the optical signal to carry forth overlay directive to downstream nodes.

The support CPU 206 can edit the overlay codes to match the next downstream function such as a cross connect or add-drop nodes. When wavelengths are finally combined into the output fiber 210, overlaid code formats in parallel mode or a serial header code, are still preserved. This is a simple function since the support CPU 206 controls all packets flowing within the buffer loop fiber 236. All wavelengths in the buffer loop 236 are coupled through amplifiers to recode packet bits with overlay data before the packet exits on the output fiber 210. Parallel synchronization is performed by the CPU 206. In applications where a basic buffer loop without wavelength conversion or SOA elements are used, the generation of overlay codes is performed only at regeneration points and other node intersections that have the ability to transmit this code format. Gain overlay encoding is used wherever a laser is the active source.

In sections of the optical network where optical packet traffic is controlled with passive components such as filter based add-drop nodes, lasers are not available for transmission of gain overlay codes. Real time communication between such nodes can still be achieved using the technique of attenuation overlay encoding. Attenuator encoding may be performed using a Bell Labs MARS (Mechanical Anti-Reflection Switch) device. The MARS device is an optical structure that combines a movable reflective surface with an interferometer cavity. The MARS device has a reflecting micro-mirror which may be varied in reflectance from near 0% to near 100%. When this device is linked to the outputs of a DWDM demultiplexer, overlay codes in an 110 attenuation format may be embedded across any wavelength signal.

ONE bits are encoded with intensity attenuation and ZERO bits are defaults which are not encoded. One laser channel is required inside the attenuation encoder for generating a decoder pulse on the marker channel.

For both gain and attenuation encoding techniques, the overlay data rate supported is linked to the speed of the signal modulator. The response speed of a distributed feedback laser in gain encoding will be much faster than the response speed of the MARS device in attenuation encoding. Fast overlay gain encoding may carry all forms of data to support direct packet switching while slower attenuation encoding is adequate to communicate restoration control and performance monitoring.

Within the buffer loop 260 in FIG. 8, the demultiplexed wavelength signals have several reserved channels labeled A, B and C designed to induce known delays to wavelength signals sent into these channels. Channels 1, 2, 3 and 4 are normal DWDM channels in FIG. 8. If channels 1, 2 and 3 contained parallel packets to be groomed into a single wavelength the sequence is as follows.

The CPU 206 directs a series of wavelength converters 262 located after the delay loop 232 in channels 1, 2 and 3 to change the wavelengths 1, 2 and 3 into wavelengths A, B and C respectively. The input light into the wavelength converters 262 serves as a gate signal to a SOA element. The SQA element is positioned on one side of a Mach-Zehnder interferometer well known in the art. An integrated laser source is coupled to the second leg of the interferometer. When the light signal is gating the SQA element, it causes a refractive change in the SQA crystal that alters the phase of the integrated laser source coupled to one leg of the Mach-Zehnder interferometer. When this occurs, the laser light will exit the wavelength converter 262 which is termed as the ON or light state. When the phase is returned to normal with the absence of the input light, no light will exit the wavelength converter 262. This is termed as the OFF or dark state. The converter 262 has the ability to clone the input light and perform restoration functions based on the input filtering and SOA operating conditions as known in the art. In additional to cloning the input light signal, the wavelength converter 262 can change the input signal to a different wavelength typically within 4 nsec., a limitation set by the distributed feedback laser (not shown) used.

A series of wavelength drop filters 270 located immediately after each converter 262 are tuned to drop only wavelengths A, B and C, while passing all other wavelengths. Since channel wavelengths 1, 2 and 3 are now wavelengths A, B and C, they are dropped and looped back into the demultiplexer 228. When these packets exit the demultiplexer 228, they exit as wavelengths A, B and C. Each of these wavelengths is then routed through different length delay loops such as delay loop 272 for wavelength A, delay loop 274 for wavelength B and delay loop 276 for wavelength C. At the end of each delay loop 272, 274 and 276, the three wavelengths are converted to the final desired wavelength. In this example, the wavelengths A, B and C are converted to wavelength 1 by wavelength converters 278 after exiting the delay loops 272, 274 and 276 respectively. With the induced delays from the delay loops 272, 274 and 276, the three channels are forced into proper TDM time synchronization so they do not overlap. For example, the induced delay in the delay loop 274 for wavelength B is twice that of the delay loop 276 for wavelength C while the induced delay in the delay loop 272 for wavelength A is twice that of the delay loop 274. In the event that one packet is longer in length and requires additional delay, it can be relooped again into the demultiplexer 228 to add more delays.

The CPU 206 may therefore groom packets from any channel into any other channel and form many combinations of packet streams. The signals are amplified by the SOAs once per pass through the buffer loop 236. The saturated SOAs in this configuration provide two regeneration functions, reamplification and reshaping, in this example. Of course, the retiming function may also be performed by the saturated SOAs with additional hardware. The buffer loop 260 with grooming capabilities is made possible only by the optical serial code detectors 208 to instantaneously read packet IDs synchronized to the packet header while staying under the header time frame. The enhanced optical buffer 260 allows packet grooming to be performed at packet levels ahead of add-drop or cross-connect nodes. Improved bandwidth utilization, lower system costs and higher traffic routing efficiency are the result. The buffer 200 in FIG. 7 and buffer 260 in FIG. 8 may be matched to microsecond response cross-connect products such as the Lucent Lamda router or the Agilent bubble array. In this example only three wavelengths are used but it is to be understood that more wavelengths may be reserved for this function.

FIGS. 9A–9G are a series of packet grooming event charts demonstrating the ability of packet grooming. FIGS. 9A–9G show how four input optical packets with different wavelengths (channels 1–4) are converted into one single wavelength signal (channel 5). The four input wavelengths must be retimed to follow each other serially without overlap and then converted to the same wavelength. Once converted, the four packet data stream may be injected back into the main optical data stream as a groomed signal. Incoming packets may be groomed to share the same wavelengths if their destinations are similar. In additional, the number of active wavelength channels may be optimized to meet traffic demands. This eliminates the problem of using all optical channels when only one or two channels will hold all active data traffic.

Figure 9A:
FIGS. 9A–9G is a packet flow diagram showing the packet grooming capabilities of the optical buffer loop in FIG. 7.
Figure 9B:
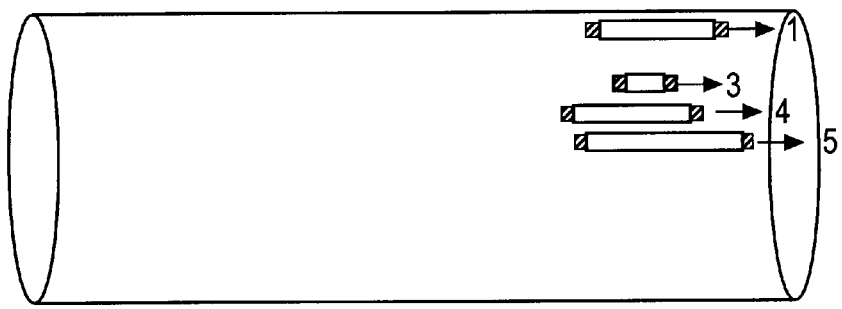
Figure 9C:
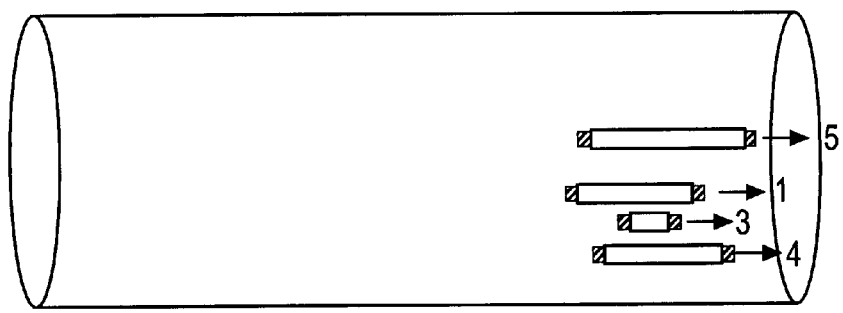
Figure 9D:
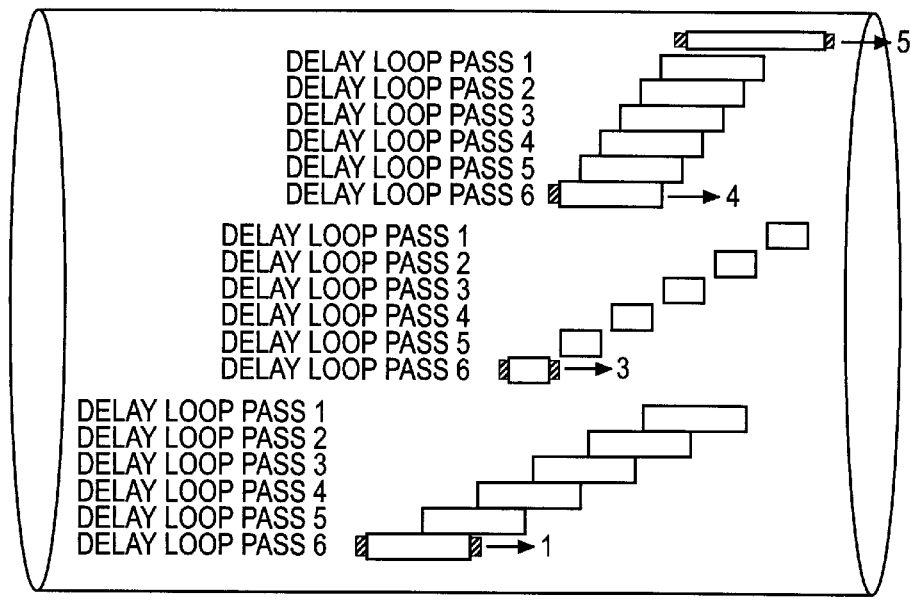

FIGS. 9A & 9B show how the four chosen optical packets are stripped from the main fiber line and routed into the buffer loop 200 in FIG. 8. In FIG. 9C, the four packets from channels 1, 2, 3 and 4 are converted to four new, reserved wavelengths. The new wavelengths are special wavelengths that will later be trapped by the fiber loop 236 and forced to recycle as shown in FIG. 9D. All four packets are routed through different delay loops such as delay loops 272–276 in FIG. 8 that are progressively longer for each wavelength (color). In FIG. 9D, the packet in channel 2 is the lead packet and is not delayed. To maintain the correct timing relationship, channel 2 is cycled along with channels 1, 3 and 4 to build up the desired delays. Channels 1, 3 and 4 will pass through their respective optical serial code detectors 230 in FIG. 7 while each pass is counted by the supporting CPU 206. At the first pass through the serial optical code detector 230, the CPU 206 requests further delay. Each of the light channels 1, 3 and 4 generates independent action triggers to CPU 206 as the leading edge of each packet is detected by their respective optical detector 230. The time relationship of the triggering pattern allows the CPU 206 to automatically determine how many delay passes are necessary to produce the delay sequences desired. Since each packet header contains information on its own length, CPU 206 can compare this data to the detected triggering event and calculate how much more delay is required. When the desired delay sequence is obtained, all channels may be converted to a single wavelength without danger of overlap or collision.

Figure 9E:
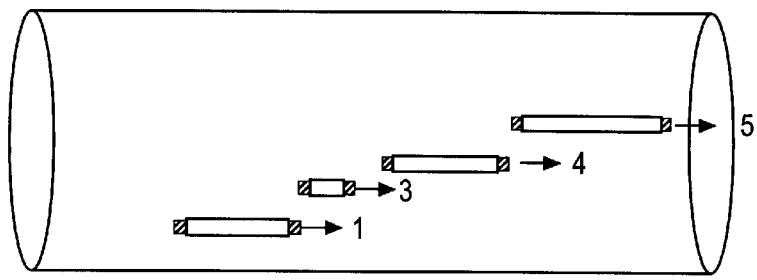
Figure 9F:
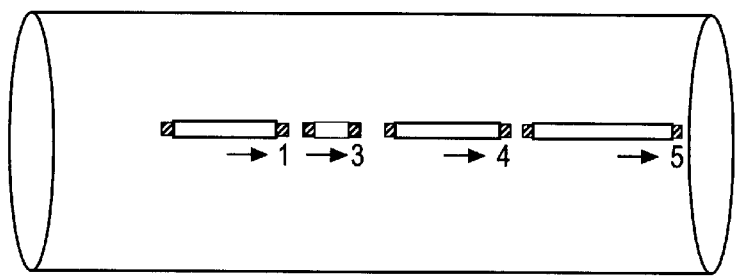
Figure 9G:
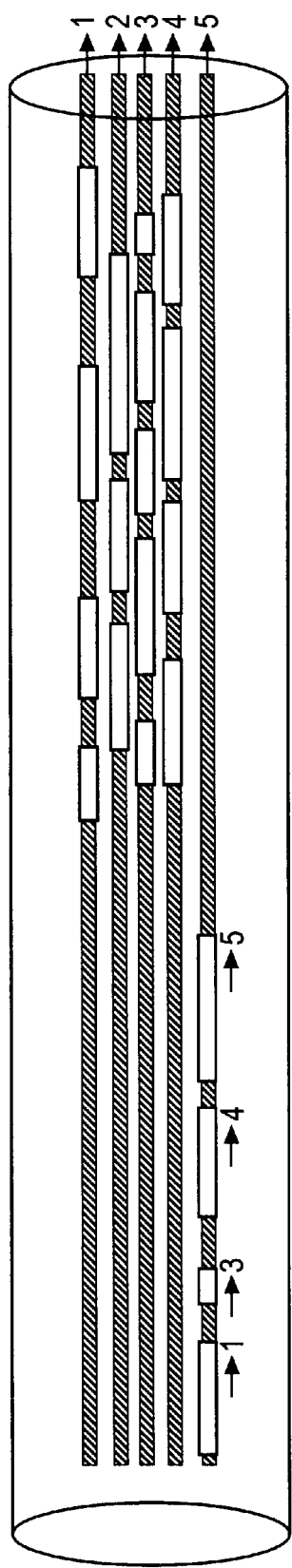

The light packets in the four channels are rerouted back to the demultiplexer 228 by the wavelength drop functions located in each branch. The decision to pass or reroute an optical packet is a decision made by the CPU 206. By relooping the optical packets multiple times, a high degree of control is possible for spreading out the time relationship of each packet in respect to each other. After six passes, the desired timing relation is achieved as shown in FIG. 9E. The four channels in the sixth pass then undergo wavelength conversion to the same wavelength used in channel 2 as shown in FIG. 9E. Instead of being looped back to the demultiplexer 228 in FIG. 8, the four channels are passed through, rejoined by the DWDM multiplexer 248 and sent back to the main fiber trunk as shown in FIG. 9F. The other packets shown in FIG. 9F demonstrate the real time position of other packets that were traveling with the four selected packets in FIG. 9A. The ability to buffer and manipulate delays on the packet level allows unlimited grooming capabilities to permit packet routing in real time while still permitting slower optical blocks such as cross connect nodes and tunable add-drop nodes to be used.

Two types of optical serial code detector units are used in packet header decoding. These types differ only in the ability to match a data set against a fixed reference pattern or against a programmable reference pattern which may be modified from cycle to cycle. For the optical buffer loop 200 in FIG. 7, the optical serial code detector 230 used is based on fixed reference pattern matching which is less complicated than full packet header decoding. The buffer loop 200 merely decodes the packet ID and the next action required in routing the optical packet. For full header packet decoding, an optical serial code detector with programmable reference patterns is used.

Figure 10:
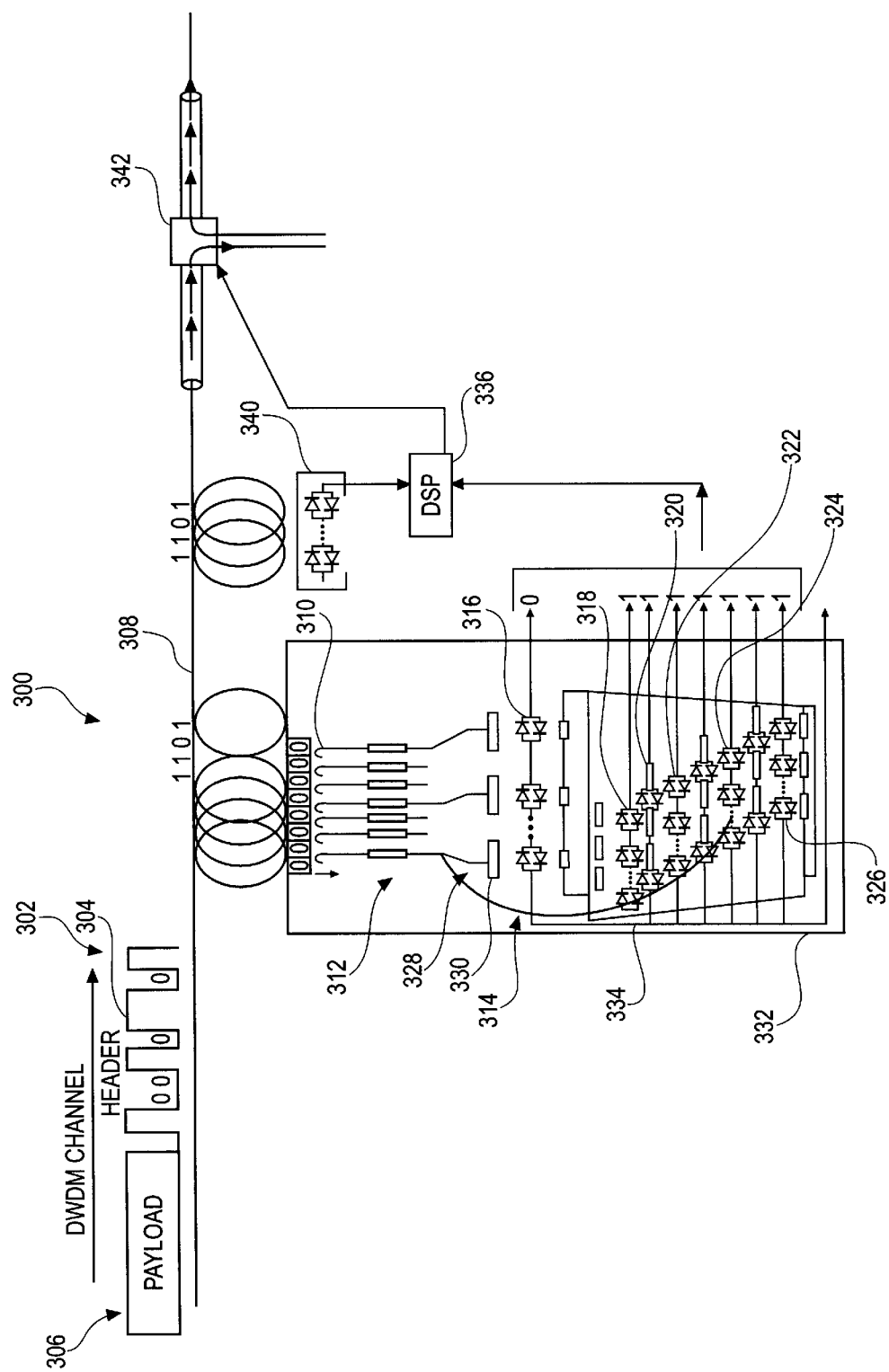
FIG. 10 is a block diagram of a direct header pattern decoder engine based on a preset optical look-up table.

FIG. 10 shows a block diagram of an optical serial code detector 300 which may be used for the optical serial decoder 230 in FIG. 7 and FIG. 8. The optical serial code detector 300 is designed to use VCSEL laser arrays that are preset to perform parallel pattern matching on incoming packet header codes.

An incoming optical packet 302 is modulated at a specific wavelength and has a header portion 304 with codes such as address and control codes. The data in the data packet 302 is carried in a relatively longer data portion 306. The optical packet 302 is first converted from a serial to parallel format using a series of closely spaced format conversion fiber loops 308. At 10 gigabits/second, each optical loop 308 is around 2 cm in length. The format conversion loops 308 are therefore set up to have 2 cm circumference loops. This is short enough that the loops may be integrated onto an optical circuit substrate such as Lithium Niobate (LiNbO3) along with the detector electronics.

The conversion loops 308 permit a long serial string of bits from a packet to be physically transposed into a closely spaced orientation to allow parallel processing of all bits in a small area. For example, a bit string of 1000 bits is 2000 cm long serially but inside a 1000 turn converter loop, the bits lined up side by side would occupy 20,000 microns (using 10 micron waveguides at 20 um pitch) or 0.02 cm.

A series of optical taps 310 at the mid point of each converter loop 308 sample a small percentage of light in each loop bit and sends this light through an SOA amplifier array 312. The SOA array 312 is set for saturation gain operation which causes the output of the SOAs in the array 312 to be either full ON or full OFF. This allows input light intensities representing logic ONEs to be converted to a uniform light intensity at the outputs of the SOA array 312. A series of optical detector arrays 314 is composed of different detector arrays 316, 318, 320, 322, 324 and 326. Each detector array 316–326 is composed of optical detectors such as the optical detector 10 in FIG. 1 corresponding to a segment of bits corresponding to the converter loops 308. The output of each SOA in the SOA array 312 illuminates one of the photo detectors of each of the optical detectors in the optical detector arrays 314. The optical detector arrays 314 are hard programmed to respond to specific patterns of bits. The detector units in the arrays 314 are either set for a logic ONE light intensity in which case, a NiP photo detector senses the input light, or for detectors set for logic ZERO detection where a PiN photo detector senses the input light. The SOA outputs of the SOAs of the array 312 are coupled to the optical detectors of the detector arrays 314 via standard planar waveguides 328. Optical power available at the SOA output is matched to drive the plurality of photo detector elements required in the array. At each optical detector in the detector arrays 314, the input light may go through a trimming aperture 330 to condition the input light intensity to be within a target range for proper operation of the detectors of the arrays 314.

The reference side of each optical detector in the detector arrays 314 is illuminated by a light emitter. The light emitter is a pattern matching array 332 in the detector 300 which has VSCEL laser elements 334 that are programmed to be ON or OFF. In the ON mode, individual VSCELs may also be varied in intensity to permit calibration of the array during manufacturing. For logic ONE sensing, the laser elements 334 are focused on a PiN reference detector to balance the NiP photo detector while for logic ZERO sensing, the laser elements 334 are focused on a NiP reference detector to balance the PiN photo detector.

When the leading edge of the optical packet 302 reaches the end of the converter loops 308, a start code pattern is recognized by the first array detector 316 which is coupled to the last series of the converter loops 308. This start code is the same for any optical packet and permits the sensors looking for a code to be hard programmed. When the start code (a 1011 pattern in FIG. 10) is detected, all the bits following the start code will also be properly located within the converter loops 308.

In the buffer loop 200 in FIG. 7, the code detector 230 may sample 6 bits of the header packet to produce a packet ID for optical packets currently inside the buffer 200. The pattern matching array 314 in FIG. 10 consists of 64 strings of 6 element decoder arrays 316–328 which detect the packet ID code. All the outputs from this 64 string array will have nonzero values when a match is not sensed. Of course different numbers of arrays of different lengths may be used. Additionally, the output of the different arrays may be sampled to detect the presence of individual codes in the header portion 304 of the packet.

A supporting CPU 336 will quickly sense any output from the detector arrays 316–328 that shows a zero minimum as a result from a match. When a match occurs, the optical packet is physically about to exit the buffer fiber loop 236 of the buffer loop 200 in FIG. 7. If the current packet is dropped out at the next control node such as control node 342, the CPU 336 will immediately send a command to activate the switch array 234 in FIG. 7. Depending on the speed of this switching action, a small delay loop or a special trigger loop 338 may be inserted between the converter loops 308 and the next control node 342. For a slower node switch, a longer delay loop is used. For a very fast switch, a start code detector array 340 which is similar to detector array 316 generates a trigger signal when it detects the beginning of the optical packet 302. The location of the start code detector array 340 is selected to allow a fast switch at the control node 342 to transfer state for the incoming packet in a specific time interval. With fast switching, the switch may be serving many wavelengths continuously and the transfer time duration to satisfy a single packet must be kept as short as possible. The trigger output from the additional start code sensor permits this time optimization to occur.

Figure 11:
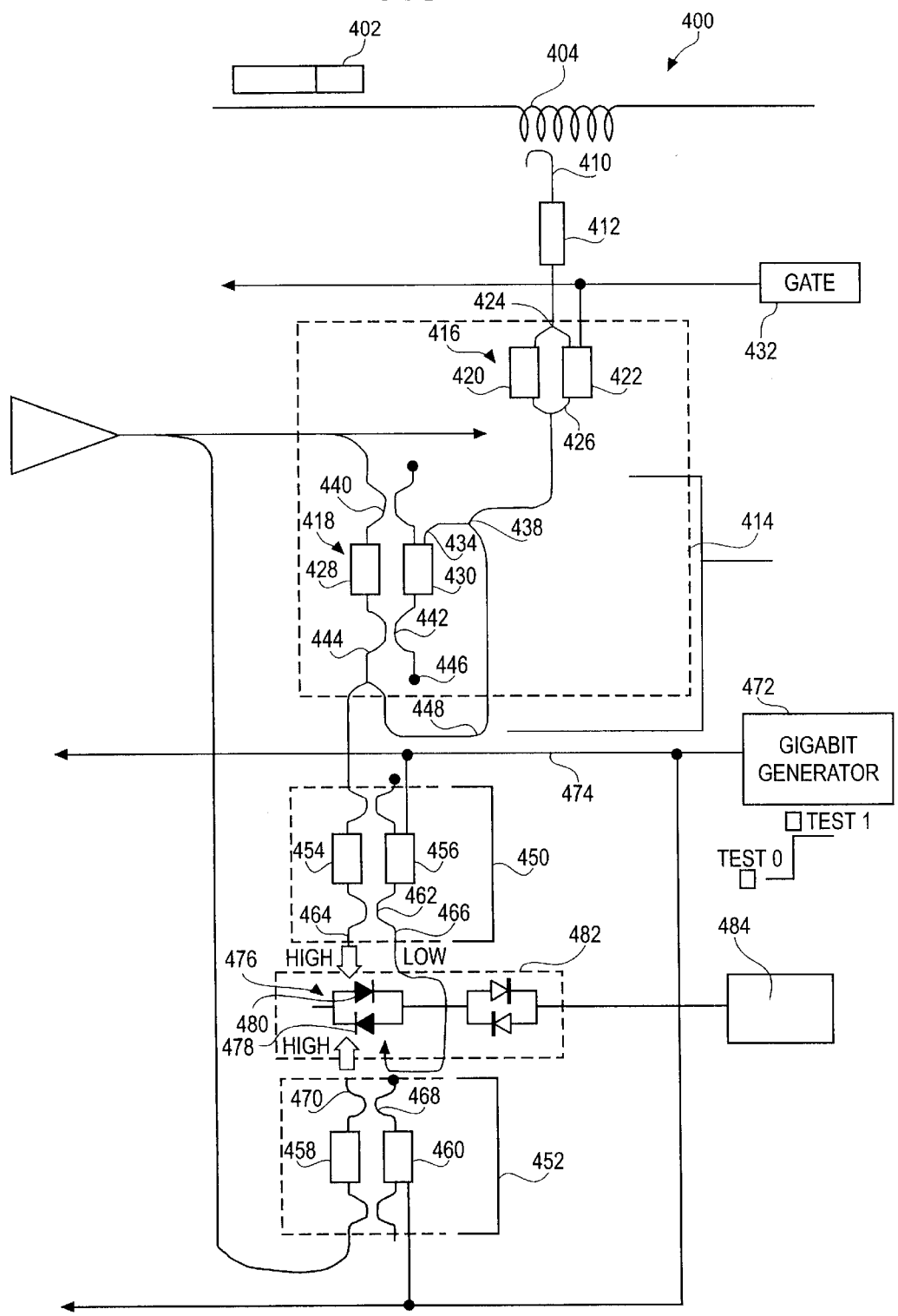
FIG. 11 is a block diagram of an alternative direct header pattern decoder engine based on a dynamic programmable look-up table.

FIG. 11 is a circuit diagram of a serial code optical detector 400 which is an alternative for the serial code detector unit 230 in FIG. 7. The detector 400 also detects the header codes in a data packet but instead of a fixed pattern VCSEL matching array, a dynamic programmable matching approach is used.

An incoming optical packet 402 is first converted from a serial to parallel format using a series of closely spaced converter loops 404. A series of optical taps 410 at the mid point of each converter loop 404 samples a small percentage of light in each loop bit and sends this light through an SOA amplifier array 412. The output of each SOA in the SOA. array 412 is sent into an optical latch 414 that holds this light logic state inside its latch memory.

The latch 414 consists of two pairs of SOA switch elements 416 and 418. The first pair of switch elements 416 has a SOA element 420 and a SOA element 422. The first pair of switch elements 416 forms an ON/OFF switch with an input 424 and an output 426. The SOA elements 420 and 422 serve as a sampling gate permitting light sensed from input taps 410 to reach the optical latch 414.

The active portion of the optical latch is formed by the second pair of switch elements 418 which has a SOA element 428 and a SOA element 430. An electrical gate input 432 is coupled to the SOA element 422 The gate input 432 may be a signal from dedicated optical detector (not shown) sensing the start bit pattern in the leading edge of the packet 402. The dedicated optical detector ensures optimal latching of data in the loops 410 at data midpoints. When light is present at the input tap 410 during active sampling by a gate signal from the gate input 432, the light at the output 426 will directly track the light signal carried by input tap 410. The SOA element 430 has a control input 434. The inputs of both the SOA elements 428 and 430 are optically coupled to the output of a laser 436.

Light at the output 426 will enter a merging junction 438 and enter the control input 434 of the SOA element 430. If the intensity of the light at the control input 434 is at a logic ONE level, the SOA element 430 will cause an additional 180 degree phase shift in the light passing through the SOA element 430. Without a gating light signal at the control input 434, light passing through the SOA element 430 is not phase shifted.

In the unlatched state and with no light signal to the control input 434 the laser 436 will send continuous light into the SOA element 428 and the SOA element 430 via an input junction 440. As the laser light enters the input junction 440, it is split into two equal intensities by effervescent coupling whereby half the light enters the SOA 428 at 0 degrees phase and half the light enters SOA element 430 is at 90 degrees phase. This extra 90 degrees phase shift is a consequence effervescent coupling.

The output of the SOA elements 428 and 430 is coupled via an output junction 442 which has a first output node 444 and a second output node 446. When the light from SOA elements 428 and 430 meets at the output junction 442, another equal split of the light occurs between the first output 444 and the second output node 446 occurs in both directions. At the output node 444, half the light is at 0 degrees phase from the SOA element 428 and the other half from the SOA element 430 is shifted another 90 degrees.

The light at output node 444 thus consists of two equal wavefronts 180 degrees apart (0 degrees and 90+90 degrees) and will cancel. The result is darkness at the output node 444.

The opposite is true at the second output node 446. Half of the light from the SOA element 430 at 90 degrees phase shifted while the other half if the light from the SOA element 428 is phase shifted 90 degrees. The light at the second output node 446 is from two equal wavefronts in-phase (90 degrees and 90 degrees) and is constructively added.

A feedback line 448 optically couples the first output node 444 to the merge junction 438. No light exits the first output node 444 under normal conditions and therefore the feedback line 448 has no effect on the control input 434 of the SOA element 430. If the optical latch 414 samples a logic ZERO at the optical tap 410, the first output node 444 will remain dark after the gating period from the SOA element 430.

If a logic ONE state is sensed during the gating period of the SOA element 430, the output 426 will be bright and routed into the SOA element 430. This positive feedback causes the SOA element 430 to latch on in a 180 degree phase shift mode. The coupled light from the SOA element 430 into the first output node 444 will thus be phase shifted an additional 180 degrees. The light at the first output node 444 is now two equal in-phase wavefronts (0 degrees and 360 degrees) and will be constructively added. Likewise, the second output node 446 will be dark because the coupled light from the SOA element 428 at 90 degrees phase will cancel the light from the SOA element 430 at 270 degrees (90 degrees+180 degrees).

At the end of the gating period (negative logic), the signal from the gate input 432 will go high. This causes the SOA element 422 to phase shift the light input by 180 degrees. Light from SOA elements 422 and 424 are then 180 degrees out of phase canceling each other out at the output 426 producing darkness. When the signal from the gate input 432 is in the disabled state, the first output 444 will remain in the light state if a logic ONE bit was present during sampling. The first output 444 will be dark if a logic ZERO bit was present during the sample period.

The first output 444 is coupled into a switch fabric 450 and a switch fabric 452. The switch fabric 450 includes SOA elements 454 and 456. The switch fabric 452 includes SOA elements 458 and 460. The output from the first output 444 is split into the SOA elements 454 and 456. The output of the SOA elements 454 and 456 are connected via an output junction 462 which has a first output 464 and a second output 466. The output of the SOA elements 458 and 460 are connected via an output junction 468 which has an output 470.

The outputs of a pattern generator 472 are coupled via a bit compare line 474 to the SOA elements 456 and 460 of the switch fabrics 450 and 452 respectively. Each bit of the code to be compared has a corresponding detector unit such as a detector unit 476 which has a PiN detector 478 and a NiP detector 480.

When the pattern generator 472 is set to detect a ZERO state on a particular detector unit such as the detector unit 476, a low ZERO signal is sent over the bit compare line 474. A low light signal on the bit compare line 474 will cause the light output at the first output 444 to be diverted through the SOA elements 454 and 456 to the second output 466 of the output junction 462 which is optically coupled to the PiN detector 478 of the detector unit 476. The first output 464 of the output junction 462 is optically coupled to the NiP detector 480 of the detector unit 476. Since light at the second output 466 is in phase and the light at the first output 464 is out of phase, the light level at the first output 444 is optically coupled to the PiN detector 478 while the light level at the first output 464 remains dark. In this comparison mode for sensing a ZERO bit, the SOA elements 458 and 460 are not involved because the output junction 468 is in the "out-of-phase" mode or dark state and no meaningful light will exit.

If a proper ZERO bit was latched at the first output 444, a ZERO state will also exist at the second output 466 and the detector element 478 will not be illuminated. In this non-illuminated state, balance is satisfied because the detector 480 is also not illuminated by the output 464. If the latched bit was not the expected ZERO and was a ONE, the detector element 478 will be illuminated and will produce a positive error voltage signal for the detector unit 476 since the output 464 is still in the "out-of-phase" or destructive mode and will remain dark.

In the ONE state mode, the pattern generator 472 sets the bit line 474 at a high ONE level. The input of the SOA elements 458 and 460 are coupled to the laser input 436. The output junction 468 of the SOA elements 458 and 460 route the input light from the laser input 436 through the output 470 which is optically coupled to the PiN detector 478. This light is routed to the PiN detector 478 only during the detection of a ONE state. The SOA element 458 is placed into the phase shift mode and output is "in-phase" while the output of the SOA element 460 is in the "out-of-phase" mode. If a logic ONE state is detected at the first output 444, the first output 464 of the output junction 462 will have light that will be balanced by light at the output of the SOA element 458 resulting in balance or zero volts output at detector unit 476. The light output at the first output 464 will balance the light output from the output 470 if a logic ONE is present at the output 444. If a logic ZERO is present at the output 444, the first output 464 will be dark, thus causing an imbalance or positive voltage output at the detector unit 476.

The detector units such as detector unit 476 are part of an optical detector array 482 which is coupled to a processor 484. Multiple optical detector arrays similar to the array 482 may be used to increase the effective processing power even further. When multiple arrays are used, the gigabit pattern generator 472 can output several code patterns simultaneously, one to each of the optical detector signal processors. The rate of pattern comparison may be as fast as the speed of the optical detector array. This rate can typically be several times faster than the raw data rates. Each optical signal detector array 482 will output a non zero value to the supporting CPU 484 when match conditions are not seen. The condition of a match will produce a zero minimum signal on that input line to the supporting CPU 484. Post detection actions by the CPU 484 are the same as that described for the detector 300 in FIG. 10.

The advantage of the programmable pattern generator 472 is the ability to optimize code concerns for various locations within the optical network. High occurrence code patterns may be the first patterns tested to minimize processing delay time. Since the CPU 484 is programmable, it may modify this reference list in real time following the dynamics of current traffic patterns. This configuration requires fewer optical detector arrays but detection latency is greater than the VCSEL based detector unit 300 in FIG. 10. The unique advantages for each approach are complementary because various traffic nodes within the optical network will find one or the other detector engines a better match based on cost, flexibility and response speed requirements.

Figure 12:
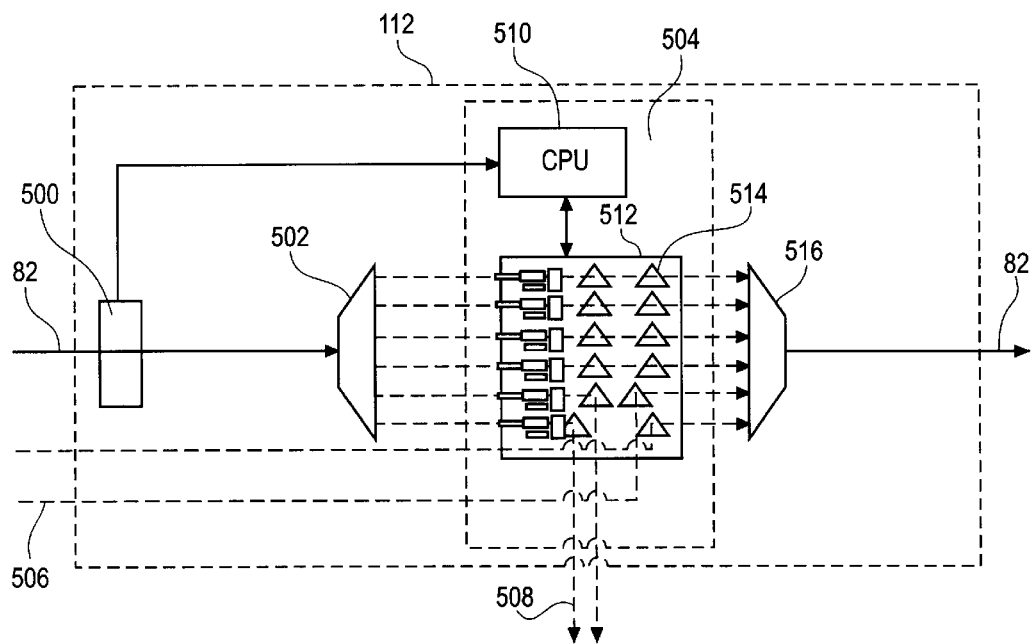
FIG. 12 is a block diagram of an add-drop router according to an embodiment of the present invention.

FIG. 12 is a block diagram of the add-drop router 112 in FIG. 4 which is optically buffered. The router 112 has the function of adding and dropping data signals from the fiber optical cable 82. For maximum routing efficiency, the number of switching cycles performed by the router 112 is minimized by pregrooming optical data packet signals by an optical buffer 500. The optical buffer 500 is similar to the buffer 200 in FIG. 7 explained above. After the optical data packet signals are groomed by the buffer 500, they are demultiplexed by an optical demultiplexer 502 into separate signals at different wavelengths. The signals are sent to an add/drop block 504. The add/drop block 504 has a number of input channels 506 and a number of output channels 508 which carry optical signals. The add/drop block has a CPU 510 which is coupled to a switching unit 512.

The optical router 112 is constructed based on purely optical routing of the optical signals to and from the fiber optical cable 82. Optical data packets which are dropped at the add/drop block 514 are controlled by the CPU 510 which may be a specialized digital signal processor. The switching unit 512 allows routing of incoming signals from either the demultiplexer 502 or the input channels 506 by means of a switching array 514. The switching array 514 has either switch fabric technology such as very fast LiNbO3 switch elements or slower reflective mirror based optics. After the signals exit the add/drop block 512, all the signal wavelengths are recombined again by a multiplexer 516 as a multichannel DWDM signal.

Regardless of the setup time required by the switching array 514, the optical buffer 500 will provide the required buffering during setup modifications. As described above, the optical buffer 500 will read both overlay codes and packet header codes in the incoming optical data packets during the buffering sequence. The communication between the optical buffer 500 and the CPU 510 governs the data stream grooming performed by the optical buffer 500. By analyzing the data in the overlay codes and the header codes relating to the optical data packets within the buffer loop of the optical buffer 500, the CPU 510 can efficiently configure the routing paths in the add/drop unit 512.

According to the addressing data read by the CPU 500 through the code detectors of the optical buffer 510, certain data channels from the fiber optic cable 82 are diverted and converted to the output channels 508 which may be other fiber optic lines such as trunk line 102 in FIG. 4 or after suitable electrical conversion hardware (not shown), wire cable lines leading to data destinations such as phone receivers, routers, computers or other devices. Additionally, the CPU 510 may also cause the add/drop unit 512 to route data signals from the input channels 506 and add these optical data packets into open bandwidth that is then multiplexed into the outgoing DWDM fiber 82. The ability of the optical buffer 510 to recode optical packets with overlay control codes permits the passing of overlay actions between interchange nodes where buffering functions are present.

Figure 13:
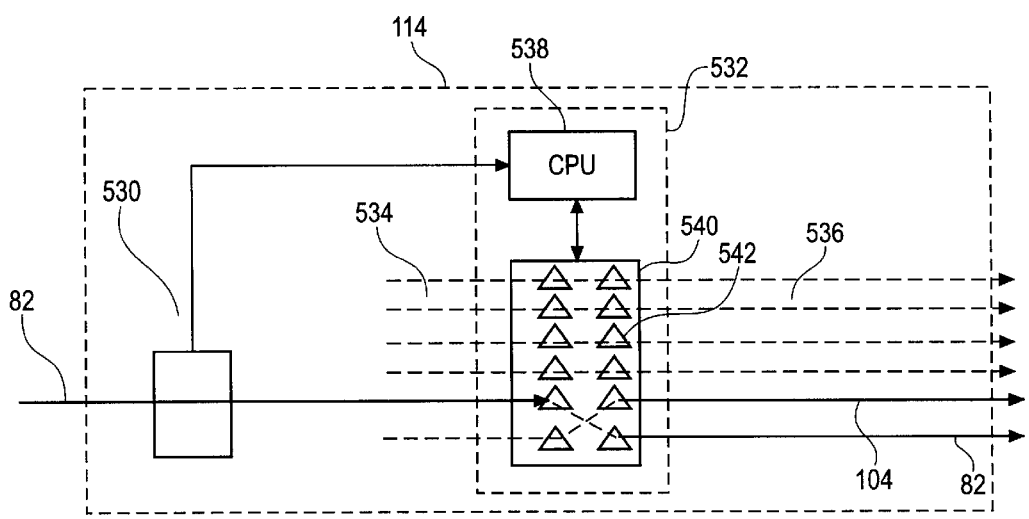
FIG. 13 is a block diagram of a cross-connect router according to an embodiment of the present invention.

FIG. 13 shows a block diagram of the router 114 in FIG. 4 which has the function of cross connecting different WDWDM signals. The optical router 114 is constructed to provide purely optical routing of the optical signals from the fiber optical cable 82. The router 114 has an optical buffer loop 530 which receives the incoming DWDM signal from the fiber optical cable 82. The optical buffer loop 530 is similar to the optical buffer loop 200 described above with reference to FIG. 7. The output of the buffer loop 530 is routed to a cross connection block 532. Other WDWM fibers 534 are also routed into the cross connection block 532. The cross connection block 532 allows the signals carried on the fibers 534 and 82 to be cross connected and output to different output fibers 536 which may include the trunk line 104.

The cross connection block 532 has a CPU 538 which controls a switching unit 540. The CPU 538 controls all switching, setup functions and communicates with the optical buffer 530 to manage all packet buffering, grooming, overlay coding and steering functions as explained above. The optical signals from the fiber lines 82 and 534 are coupled to a switching array 542. The switching array 542 has a switching element such as a micro mirror or switch fabric corresponding to each of the wavelength signals. The CPL 538 controls the optical switching array 542 to connect the incoming optical signals to different channels or wavelengths depending on the decisions between the optical buffer 530 and the CPU 538. The cross connected signals are therefore routed to continue on the fiber optic cable 82 or routed to another output fiber such as trunk line 104.

With the optical buffer 200 of FIG. 7 or the buffer 260 of FIG. 8 explained above, it is possible for the CPU 510 of the router 112 or the CPU 538 of the router 114 to ramp data throughput between nodes up and down based on traffic demand and pattern information obtained through the overlay codes. This form of data packet management results in the reliability to speed ratio always being at a maximum. Between two nodes along a long haul span, total bit error may be minimized as a function of real time if traffic volumes are strategically redistributed to all DWDM channels. The optical buffer 260 of FIG. 8 allows optical packets of one wavelength to be dynamically converted into another wavelength (color or DWDM channel) to produce load balancing on all DWDM channels. With balanced DWDM channels, effects from four wave mixing and channel spacing crosstalk are reduced to yield better bit error rate performance. Thus, at full load conditions, the DWDM reliability is at design level. At lesser demand levels, the system reliability jumps proportionally to levels much higher than specification.

The overlay encoding shown in FIG. 5 will typically occur within the buffer loop 260 in FIG. 7 by the SOAs 264 but it can also be generated by 3-R regeneration nodes such as the amplifiers 96 in FIG. 4 or by passive attenuation devices. The optical decoders 204 in FIGS. 6 and 7 may also drive other functions with equal simplicity. Any functional element possessing memory and the ability to run as fast or faster than the system clock rate is by definition an interfacing element.

Figure 14:
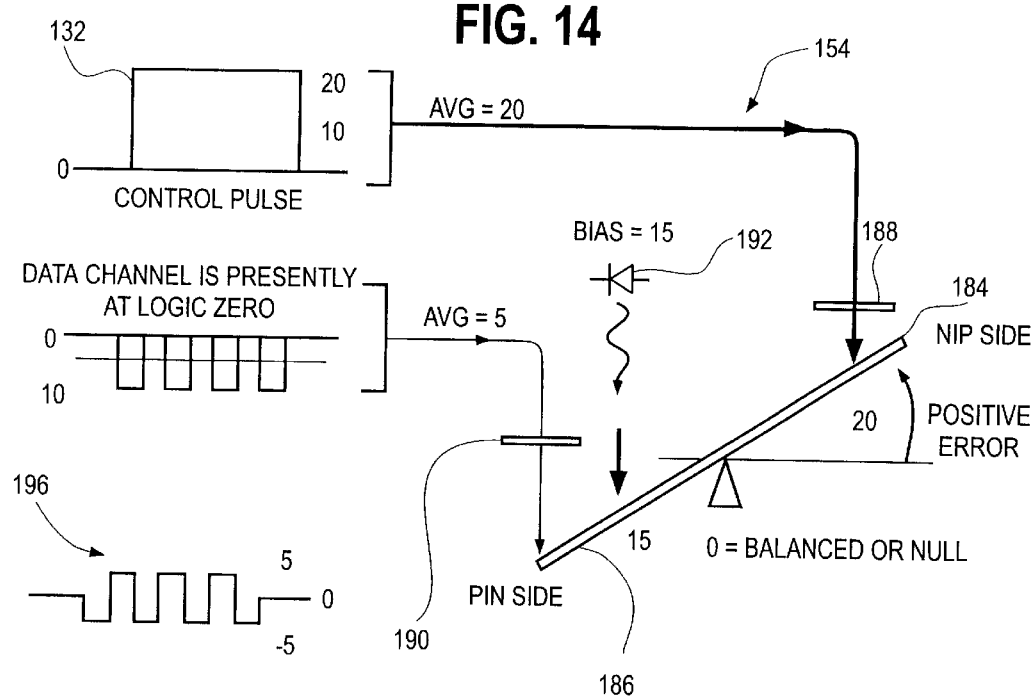
FIG. 14 is a diagram showing an average DC method for decoding data ZERO bits using the optical detectors according to one embodiment of the present invention.
Figure 15:
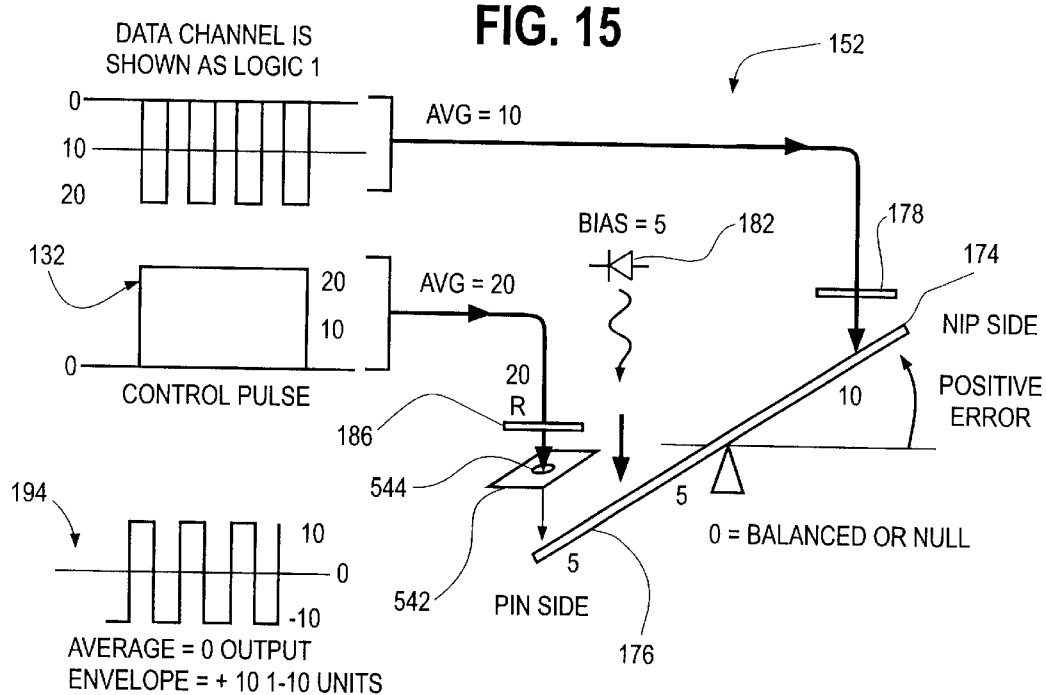
FIG. 15 is a diagram showing the average DC method for decoding data ONE bits using the optical detectors according to one embodiment of the present invention.

The code detection may be accomplished by the optical detector arrays such as array 150 in FIG. 6 by an average value method shown in FIGS. 14 and 15. The average value method for overlay bit decoding will be explained with reference to the optical detector array 150 shown in FIG. 6 in exposure to the signals in the DWDM signal 130 in FIG. 5.

A ZERO overlay bit detection is illustrated by the balance arrangement in FIG. 14. For a ZERO bit such as in channels 2, 4, 7, 9 or 11 in FIG. 6, the light levels are not amplified. The photo detectors and reference detectors of all of the detector units 152–172 in FIG. 6 are exposed to the multiplexed light signals from a DWDM fiber optic cable. Each photo detector of a ZERO bit detector unit such as the photo detector 184 of the detector unit 154 is tuned to a certain wavelength by the wavelength filter 188. The corresponding reference detector 186 is tuned to the wavelength of the marker channel by the wavelength filter 190.

When a pulse is detected on a marker channel such as marker channel 132 in FIG. 5, it activates the detector array 150 by causing the potential of the NiP reference detector 186 of the detector unit 154 (channel 2) to balance the PiN photo detector 184 which is biased by the wavelength signal and the fixed light source 192. When the output of the detectors 184 and 186 match a zero minimum output is produced at the output terminal 196. If a logical ONE (amplified light signal) was present at the photo detector 184, the output of the detector unit 154 produces a positive voltage error at the output terminal 196.

FIG. 15 shows the average value method for detecting an overlaid ONE bit. The detector unit 152 in FIG. 5 is tuned to detect a ONE bit on a selected wavelength channel by filtering input light at that wavelength by the filter 178. The detector unit 152 thus has an attenuator 542 with an aperture 544 on the reference detector 176 which is tuned by the wavelength filter 178 to the wavelength of the marker channel 132. In order to balance the light signals, the input bias LED 182 is exposed to the PiN reference detector 176. When a signal representing a ONE bit (amplified light levels) is detected by the photo detector 174, it produces a negative value which is biased by the input bias LED 182. The reference pulse on the marker channel 132 is detected by the reference detector 176. The value of the reference pulse is decreased by an aperture 544 and biased downward by the reference LED 182. The positive value of the control pulse on the reference detector 182 is canceled by the negative values of the photo detector 174 which creates an average value of zero, indicating a ONE bit. This is shown in a waveform at the output 194 which averages a zero volt value. If the signal on the channel represents a ZERO bit, the negative signal will not be as strong on the photodetector 174, thus causing the reference signal to dominate producing an average positive voltage across the detector unit 152.

The overall voltage output of all the detector units 152–172 are added together since the detector units 152–172 are wired in series. If any of the detector units 152–172 do not detect the proper bit of the address, it produces a positive voltage, and thus an overall positive voltage is produced on the output terminal 198 indicating that the address does not match the set address of the address detector array 150.

Figure 16:
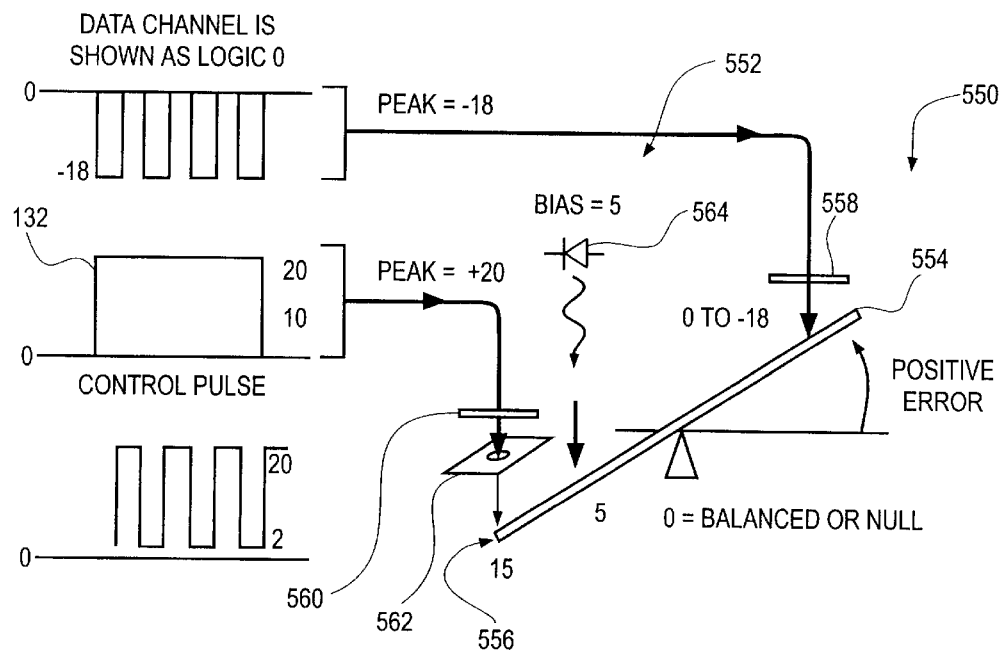
FIG. 16 is a diagram showing a fast offset DC method for decoding data ZERO bits using the optical detectors according to one embodiment of the present invention.
Figure 17:
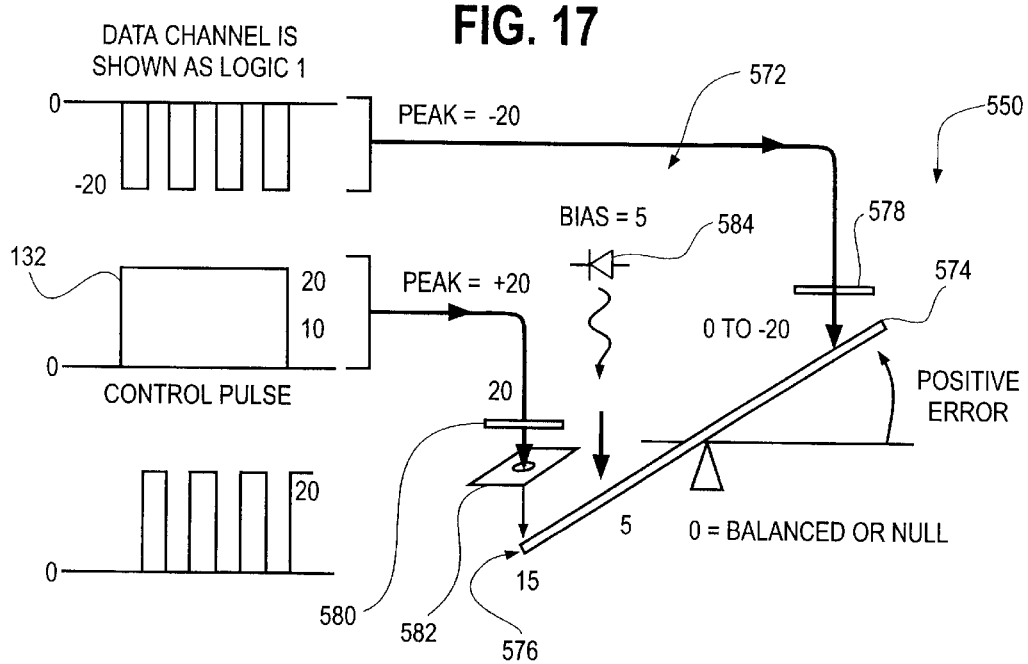
FIG. 17 is a diagram showing a fast offset DC method for decoding data ONE bits using the optical detectors according to one embodiment of the present invention.

The second decoding method is shown in FIGS. 16 and 17 and is a fast offset method requiring support from an external processor such as the CPU 206 in the buffer 200 in FIG. 7. However code detection is instantaneous and many logic elements may be supported per pattern match. The number of "logic elements" (one optical detector per channel) that may be tested in parallel is the same for either the average method or the fast offset method. Within a span of a few clock cycles, the fast offset method can output redundant matches that will increase the confidence of detection. Such a detection sequence can usually be achieved in approximately 8 clock cycles. Fast offset overlay detection is therefore an effective trigger tag for the leading edge of optical packets within a DWDM system.

In the average method, the DC value used for optical detector balancing is derived from signal filtering. A minimum of 160 data bits must pass before detection can be confirmed. The advantage of the average method is its simplicity and freedom from a supporting CPU. These two approaches are complimenting techniques within the DWDM optical network. The averaging method is best suited for point to point signaling functions (performance monitoring and restoration measures) while the fast offset method is ideal for packet steering (channel add-drop and cross connect steering) at the optical backbone.

These methods allow processing a code comparison within a short time window synchronized to the leading edge of an optical packet. The CPU supported fast offset method described in FIGS. 16 and 17 is more complex but it offers the flexibility to switch between near instant response or slower response with highest reliability. Critical codes for switch fabric action may be immediately serviced while other system codes may use the full demodulation window to increase the confidence of code accuracy and detection reliability.

The detection of a ZERO overlay bit detection is shown in FIG. 16 with reference to a detector array 550 which is similar to the detector array 150 in FIG. 6 and the WDWM signal 130 shown in FIG. 5. The detector array 550 has a ZERO bit detector unit 552 which has a NiP photo detector 554 coupled to a PiN reference detector 556. All of the ZERO bit detector units such as the detector unit 552 in the detector array 550 are wired in series with a single output. A wavelength filter 558 allows only light of a certain wavelength (channel 2 in FIG. 5) to be exposed to the photo detector 554. A wavelength filter 560 allows only light from the marker channel 132 to be exposed to the reference detector 556. The reference detector 556 has an attenuator 562 and a bias light source such as a LED 564.

When a pulse is detected on the marker channel 132 at the same time a ZERO state is present, a voltage potential is caused on the PiN reference detector 556 that counter balances against the NiP photo detector 554 sensing the input state of ZERO. This balanced state results in a voltage output which is a DC value above zero. With the fast detection method it is necessary to define balance at a positive DC voltage to eliminate the possibility that a mismatch during zero detection will produce a negative error voltage. This DC offset definition is used only for the detecting of ZERO states in fast detection since all data voltages will be above 0 volts. This prevents ambiguities that will occur if the output of the detectors can go negative during pattern decoding. If all bits of an overlay pattern were logic ONEs, the minimum voltage output from the pattern decoder will be at zero volts when match occurs. When ZERO bits are added into the match sequence, the pattern decoder will produce a positive minimum at match. The DC value of this minimum is determined by how many ZERO bits are in the desired pattern. The more ZERO bits there are, the higher will be the expected DC minimum. In a situation with a large voltage a negative offset DC value is used to shift this minimum downwards. With this DC offset, zero volts will occur only when the desired match occurs. Therefore, DC offsets are used only to compensate for ZERO states expected in an overlay pattern.

The detection of a ONE state results in a zero volt output. When no input is present in FIG. 16, a positive error is produced by the bias light on the PiN reference detector 556. When a ZERO signal is sensed, the output of the detector unit 552 is at a positive DC value. The DC value is a known value based on the number of ZERO detector units within one array. When the CPU receives the output of the ZERO detector units of the array, a fixed DC offset is subtracted to restore zero detection. If a ONE bit is sensed by any detector unit tuned to detect a ZERO bit, the output voltage of the array will have a DC value below the expected DC level for match. It is because of this reverse logic in the zero detection mode that a support CPU is required. The rapid response speed for detection, however, is preserved. Unlike the average DC method shown in FIGS. 14 and 15, the fast offset method is not dependent on RC averaging to derive an average DC value. In critical timing applications such as switch fabric control, it is desirable to respond immediately as an optical packet passes a control point. The fast offset method allows the controlling CPU to select between immediate response or slower response with redundant validation. In comparison, the average DC method has much greater simplicity and is ideally matched to signaling control between optical nodes.

FIG. 17 shows the fast offset detection method for a ONE bit. The detector array 550 has different ONE bit detectors such as a ONE bit detector unit 572 which has a NiP 110 photo detector 574 coupled to a PiN reference detector 576. All of the ONE bit detectors are wired in series to create a single output. A wavelength filter 578 allows only light of a certain channel (channel 2 in FIG. 5) to be exposed to the photo detector 574. A wavelength filter 580 allows only light from the marker channel 132 to be exposed to the reference detector 576. The reference detector 576 has an attenuator 582 and a bias light source such as a LED 584.

A ONE bit is encoded by amplifying the wavelength signal. The wavelength signal is exposed to the NiP photo detector 574 of the detector unit 564 to produce a positive output. The control pulse on the marker channel 132 is attenuated and exposed to the reference detector 576 with the input bias light 584. If no input is present, the output of the detector unit 572 is a positive error generated by the light bias 584 on the PiN reference detector 576. If a ZERO bit is present, a positive error voltage results due to stronger contribution on the PiN reference detector 574 from the marker pulse 132 and the light bias 584. A ONE bit will produce proper balance between the output of the reference detector 576 and the photo detector 574 resulting in a null value or zero volts being output from the detector unit 572.

The input light intensity of the wavelength channels is always directed to the NiP detector of each of the detector units such as the photo detector 554 of the detector unit 552 and the photo detector 574 of the detector unit 572. The PiN detector such as the reference detector 556 of the detector unit 552 and the reference detector 576 of the detector unit 572 also will have a bias light source 564 or 584 in FIGS. 16 and 17.

To ensure reliable determination for the DC voltage value used for fast detection zero match, the leading edge of the marker pulse used is extended so it is already present ahead of the overlay encoded bits. During this leading edge time which may be 25% of the total demodulation pulse, all optical data channels will hold the equivalent bit values of a zero state. The output of an optical detector array similar to the detector array 150 in FIG. 6 will contain a minimum DC voltage value that equals the DC value expected if all bits sensed by the array were in logical zero states. If the array holds only 4 detector units for zero bit compare and has 8 elements in total for the array, the supporting CPU will have this data and will automatically scale the minimum voltage point by 0.5 (4 elements/8 total elements) and use this value for the expected zero state DC value for a zero bit match.

The average value method described above with reference to FIGS. 14 and 15 may be modified for detecting attenuation encoding. Since attenuation encoding will result in ONEs being encoded at a slightly lower amplitude, the ONE detection process will be reversed with a PiN photo detector serving to detect an attenuated input signal against the marker signal on a NiP reference detector. The ZERO detection process will also be reversed using a NiP photo detector serving to detect the signal and an attenuated marker signal on a PiN photo detector. Thus, the ONE detection process for attenuation encoding uses the process described with reference to FIG. 14 while the ZERO detection process uses the process described with reference to FIG. 15. The level of the bias will be adjusted accordingly for proper operation. The method described with reference to FIG. 15 is used to detected the higher voltage state of the logic configuration while that of FIG. 14 is used to detected the lower voltage state of the logic configuration.

Similarly, the fast offset method described above with reference to FIGS. 16 and may also be modified for detecting attenuation encoding. The method described with reference to FIG. 17 is used to detect the higher voltage logic state (ZERO in attenuation encoding) and the method in FIG. 16 is used to detect the lower voltage logic state (ONE in attenuation encoding). The detector units are identical to that described above, the marker signal is attenuated and biased to a PiN reference detector while the input signal is coupled to a NiP photo detector. The ZERO bit detectors are wired in series and a code match is indicated by a zero voltage. The ONE bit detectors are also wired in series and a code match is indicated by the detection of a specific voltage level.

Figure 18:
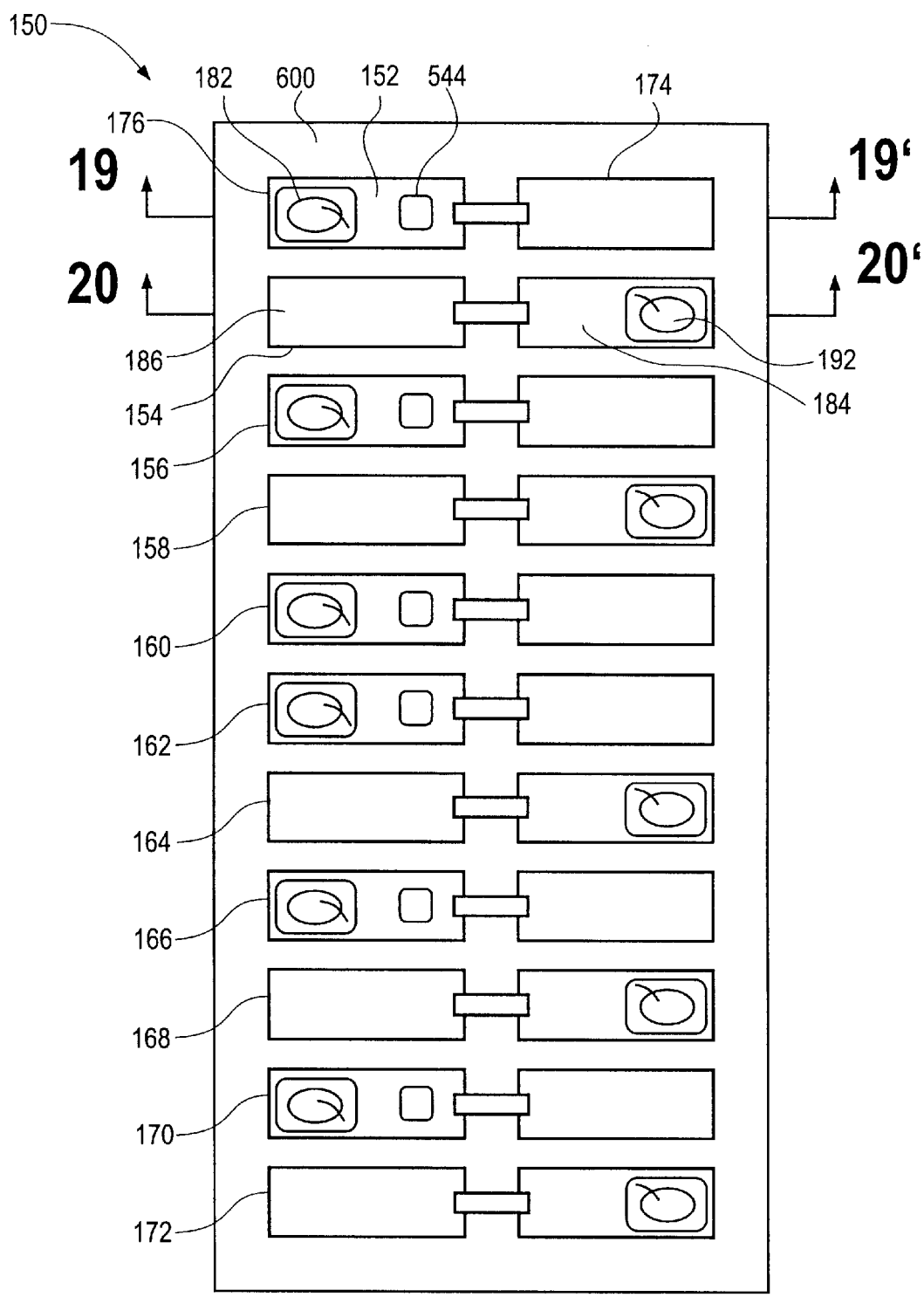
FIG. 18 is a top view of an integrated circuit implementation of an optical PiN address decoder array according to an embodiment of the present invention.
Figure 19:
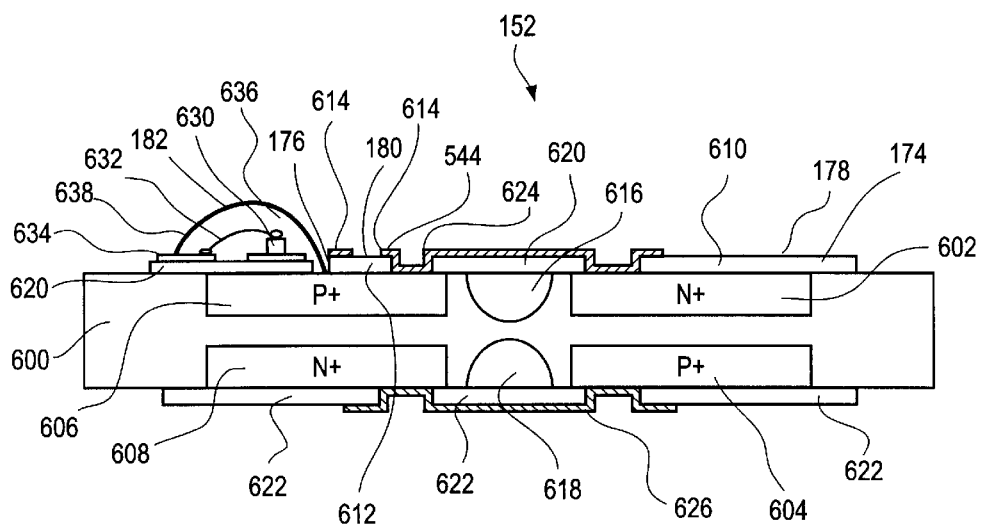
FIG. 19 is a side cross-section view of a ZERO bit PiN detector integrated circuit of the optical decoder array in FIG. 18 taken along the line 19–19'.
Figure 20:
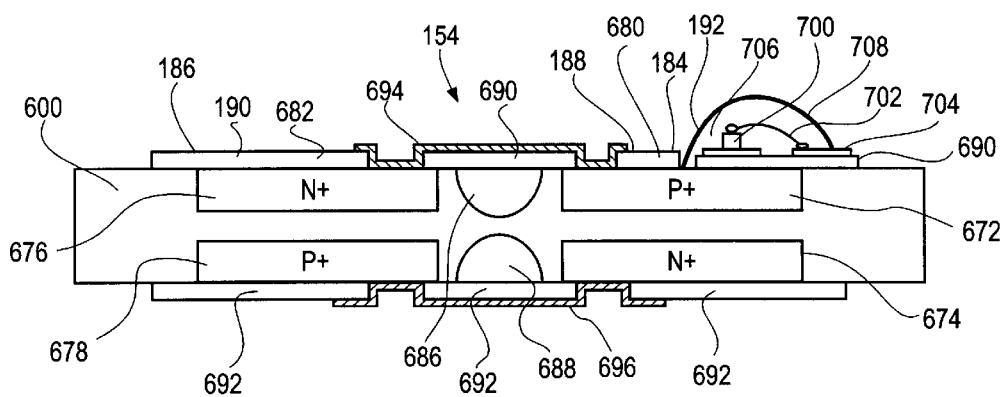
FIG. 20 is a side cross-section view of a ONE bit NiP detector integrated circuit of the optical decoder array in FIG. 18 taken along the line 20–20'.

An integrated circuit fabrication of the parallel overlay code detector 150 shown in FIG. 6 and similar to the code detector array 204 in FIGS. 10 and 111 is shown in FIGS. 18–20. FIG. 18 is a top view of the detector array 150 while FIG. 19 is a cross section view of the fabrication of the detector unit 152 which detects a ONE bit and FIG. 20 is a cross section view of the fabrication of the detector unit 154. The detector array 150 is fabricated from silicon in this example. However, for operation in the 1.55 um wavelength window, GaAs or Indium Phosphide base materials with various epi layer formulations are used but the processing technique is similar to that of silicon. The end result are still PiN and NiP photodiodes formed with GaAs, InGaAs, InGaAsP, etc. structures that are matched in response to the wavelengths of the application band.

With reference to FIGS. 18 and 19, the detector unit 152 is designed for logic ONE bit detection which is gain encoded. The detector array 150 is formed on a substrate 600 which is formed of bulk P doped silicon. The photo detector 174 has a N+ doped region 602 which is formed on the top of the substrate 600. The photo detector 174 also has an P+ doped region 604 which is formed on the bottom of the substrate 600 opposite the N+ doped region 602.

The reference detector 176 has a P+ doped region 606 which is formed on the top of the substrate 600. The reference detector 176 also has an N+ doped region 608 which is formed on the bottom of the substrate 600 opposite the P+ doped region 606.

The wavelength filter 178 is formed from a dielectric filter layer 610 over the N+ doped region 602 which permits only specific wavelengths of light to be transmitted to the N+ doped region 602. The reference filter 180 is formed from a dielectric filter layer 612 over the P+ doped region 606 which permits only the wavelength of the marker channel 132 in FIG. 5 to be transmitted to the P+ doped region 606. An aluminum attenuation mask 614 is formed over the layer 612 to provide the aperture 544. Two channel stops 616 and 618 are formed from P+ doped material to separate the photo detector 174 and the reference detector 176. A protective oxide layer 620 is formed over the top surface of the substrate 600 and a protective oxide layer 622 is formed over the bottom surface of the substrate 600. A top conductor 624 is formed from the attenuation mask 614 and electrically couples the N+doped region 602 to the P+ doped region 606. A bottom conductor 626 is fabricated from aluminum and electrically connects the P+ doped region 604 to the N+ doped region 608.

The reference bias LED 182 is fabricated from an LED die 630 near the reference detector 176. The emission wavelength of the LED die 630 only needs to be within the response range of the detector material and does not have to match the tuned wavelength of the input optical light energy. With silicon based detectors, the optimum response wavelength is between 800 to 900 nm and typically used in short haul fiber links in metro distribution. By contrast, long haul fiber wavelengths use wavelengths around 1.55 um (L band) while shorter spans of the backbone use wavelengths around 1.31 um (C band). The bias LED wavelength used for all the detector units in the array 150 can therefore be of the same wavelength, 830 nm as an example with GaAlAs LEDs. The LED die 630 is mounted to the substrate 600 with standard pick and place technology.

A bondwire 632 is coupled to a conductor 634 which provides electrical power to the LIED die 630. The LED die 630 is overcoated by a conformal clear coat 636. In order to prevent stray light from being exposed to the LED die 630, a light block overcoat is applied over the clear coat 638. The bond wire 632 to the LED die 630 is protected by the conformal coating 638 which also serves as a light pipe, restricting bias illumination to be sensed only by the intended detector elements.

The fabrication of a ZERO bit detector for detecting gain encoded ZERO bits such as detector unit 154 is similar. With reference to FIGS. 18 and 20 the integrated circuit fabrication of the detector unit 154 formed on the substrate 600 will now be explained. The photo detector 184 has a P+ doped region 672 which is formed on the top of the substrate 600. The photo detector 184 also has an N+ doped region 674 which is formed on the bottom of the substrate 600 opposite the P+ doped region 672. The reference detector 186 has a N+ doped region 676 which is formed on the top of the substrate 600. The reference detector 186 also has an P+ doped region 678 which is formed on the bottom of the substrate 600 opposite the N+doped region 676.

The wavelength filter 188 is formed from a dielectric filter layer 680 over the P+ doped region 672 which permits only specific wavelengths of light to be transmitted to the P+ doped region 672. The reference filter 190 is formed from a dielectric filter layer 682 over the N+ doped region 676 which permits only the wavelength of the reference channel 132 in FIG. 5 to be transmitted to the N+ doped region 676. Two channel stops 686 and 688 are formed from P+ doped material to separate the photo detector 184 and the reference detector 186. A protective oxide layer 690 is formed over the top surface of the substrate 600 and a protective oxide layer 692 is formed over the bottom surface of the substrate 600. A top conductor 694 is formed from aluminum and couples the P+ doped region 672 to the N+ doped region 676. A bottom conductor 696 is fabricated from aluminum and electrically connects the N+ doped region 674 to the P+ doped region 678.

The input bias LED 192 is fabricated near the photo detector 154 and is fabricated from a LED die 700. A bondwire 702 couples a conductor 704 which provides electrical power to the LED die 700. The LED die 700 is overcoated by a conformal clear coat 706. In order to prevent stray light from being exposed to the LED die 700, a light block overcoat is applied over the clear coat 708.

The number of bits in the address code for the present invention depends on the number of DWDM channels in the optical fiber 82. Thus, a typical DWDM channel may include addresses of up to 200 bits corresponding to 200 channels. Channels will typically be divided into small bit groups to encode specific information. Of course more or less channels may be used depending on the address codes desired.

One of the innovations of the optical address detector is the ability to differentially compare multiple light energies at the different wavelengths. Once set for a certain address pattern, each optical address detector can respond to only one combination code. Multiple optical address detectors may function together to produce complex traffic management systems in optical systems.

The output of the optical address detectors is a final decision output that can be directly processed by a supporting processor with little bandwidth demands from this processor. This is an improvement compared to other technologies that must extract the raw photoelectric signal before any processing can occur. The speed and accuracy of the optical address detectors circumvents many problems associated with secondary processing and light-to-photocurrent conversions.

The optical address detection method permits each detector element such as the detectors 204 in FIGS. 10 and 11 to function as an integration of three powerful processing blocks. First, the optical detector is a direct light-to-light differential comparator. Second, the optical detector is an analog computing element where balance in input conditions will produce one unique output such as a null which represents a coding match. Third, the output of the detector is a direct voltage with a unipolar response where non-match situations will always produce a positive output voltage and only a match condition will yield zero volts. In combination, the three processing elements within each address detector element preprocesses a gigabit data stream and yields only a zero volt state when a match occurs. In this case, the match is for a logic ONE or ZERO. Because each address processing element can function as a self sufficient floating decision block, multiple blocks may be cascaded to form a complex light-to-light pattern matching processor. The final output from this complex matching processor is not a complex waveform but a simple single waveform where values or zero volts are the only points that matter. Since all light processing are contained within the address decoder array, DWDM channels can be decoded with little light loss, very high phase accuracy and high speed.

This simplistic output waveform can be quickly processed by a support CPU or DSP with virtually no delay or mathematical overhead. The overall response delay to a final action (such as switching of an optical switch) may be made in the sub-nanosecond range making it possible to steer light packets directly in real time with a minimum of buffering. When this is combined with a buffer loop to produce a smart buffering component, many new capabilities become possible. The buffering capability serves as the packet steering interfacing to slower switch functions that otherwise would not support direct optical packet steering.

It will be apparent to those skilled in the art that various modifications and variations can be made in the method and system of the present invention without departing from the spirit or scope of the invention. The present invention is not limited by the foregoing descriptions but is intended to cover all modifications and variations that come within the scope of the spirit of the invention and the claims that follow.

What is claimed is:

1. An optical router for routing data signals from an optical fiber to a selected destination, the optical fiber carrying a single optical signal which has multiplexed data signals modulated at different light wavelengths, a marker wavelength signal, and a data sequence corresponding to a selected data signal encoded on the different light wavelengths of the data signals, the router comprising:

an optical buffer having:
an optical data detector coupled to the optical fiber, the optical data detector having detector units which each sense light at a different wavelength and sense the marker wavelength signal, the detector producing an output indicative of the presence of a selected data sequence in the data sequence;
a fiber optic delay loop which holds the optical signal;
a data output channel;
an optical switch which is coupled to the optical fiber and the data channel;
wherein the fiber optic delay loop has a length sufficient to delay the optical signal for a time interval sufficient to detect the selected data sequence and activate the optical switch; and
a processor unit coupled to the buffer and the optical switch, wherein the processor unit reads the output of the detector of the buffer and controls the optical switch to divert the light signal to the data channel on detection of the selected data sequence.

2. The optical router of claim 1 wherein the data channel is a fiber optic cable.

3. The optical router of claim 1 further comprising an optical to electrical converter coupled to the optical switch and the data output channel, the converter converting the light signal to an electrical signal.

4. The optical router of claim 1 further comprising a demultiplexer coupled to the buffer which separates the multiplexed data signals into separate light signals modulated at different wavelengths.

5. The optical router of claim 4 further comprising:
a data input channel providing digital data as a new light signal;
wherein the optical switch is coupled to the demultiplexer and data input, the optical switch modulating the new light signal at a selected wavelength;
a multiplexer coupled to the optical switch which combines the data signals, the new light signal and the marker wavelength signal into a single optical signal.

6. The optical router of claim 1 wherein the optical switch is a switch fabric.

7. The optical router of claim 1 wherein the optical switch is an electrically controlled micro mirror.

8. The optical router of claim 1 wherein the optical detector units each have:
a photo detector having an anode and a cathode the photo detector in exposure to the single signal;
a wavelength filter which filters light at a wavelength corresponding to a data signal to the photo detector;
a reference detector having an anode, a cathode, the anode of the reference detector being coupled to the cathode of the photo detector, and cathode of the reference detector being coupled to the anode of the photo detector;
a reference wavelength filter which filters light at the marker wavelength signal to the reference detector.

9. The optical router of claim 8 wherein the photo detector is coupled to a first reverse bias element and the reference detector is coupled to a second reverse bias element.

10. The optical router of claim 1 wherein the data sequence further includes a series of one and zero bits, the one bits being coded by attenuating the light of the data signals at selected wavelengths and the zero bits being coded by maintaining the data signals at their original light level.

11. The optical router of claim 1 wherein the data sequence further includes a series of one and zero bits, the one bits being coded by amplifying the light of the data signals at selected wavelengths and the zero bits being coded by maintaining the data signals at their original light level.

12. An optical buffer for storing data signals from an optical fiber for further downstream processing, the optical fiber carrying data signals at different light wavelengths and a marker wavelength signal multiplexed as a single signal, and a data sequence encoded on the different light wavelengths by modifying selected data signals, the optical buffer comprising:

an optical data detector optically coupled to the optical fiber, the optical data detector having detector units which optically sense the data sequence, the detector producing an output indicative of the presence of a selected data sequence code;

a fiber optic output;

an optical switch having an input coupled to the optical fiber and a first output coupled to the fiber optic output, and a second outputs the optical switch permitting the optical signal to be routed via the first output to the fiber optic output or to the second output;

a buffer fiber optical loop coupled between the optical fiber and the input of the optical switch; and a processor unit coupled to the detector and the optical switch, wherein the processor unit reads the output of the detector and controls the optical switch to divert the optical signal to the first output or the second output of the optical switch.

13. The optical buffer of claim 12 further comprising:

a demultiplexer coupled to fiber optic cable and the optical switch, the demulitplexer separating the optical signal into different signals at different wavelengths, wherein the optical switch is coupled to one of the different signals; and a first multiplexer coupled to the first output of the optical switch.

14. The optical buffer of claim 13 further comprising:

a second multiplexer coupled to the second output of the switch, the second multiplexer having an output of a single signal with different signals at different wavelengths;

a second demultiplexer coupled to the output of the second multiplexer, the second demultiplexer having an output of different signals modulated at different wavelengths.

15. The optical buffer of claim 14 further comprising:

an optical code detector coupled to one of the signals modulated at a wavelength output from the second demultiplexer, wherein the signal has a header portion containing an information code encoded with different levels of light and a data portion, the optical code decoder including:

a plurality of optical storage devices coupled to the optical fiber, each of which stores a segment of the information code and emitting the light encoding the segment;

an optical detector unit for each segment of the information code, each of the optical detector units being exposed to the segment light and each having:

a first photo detector having an anode and a cathode;

a second photo detector having an anode, a cathode, the anode of the first photo detector being coupled to the cathode of the second photo detector, and the cathode of the first photo detector being coupled to the anode of the second photo detector;

a light emitter array optically coupled to the optical detector units; and a data input channel providing digital data as a new light signal.

16. The optical buffer of claim 15 wherein the first photo detector is coupled to a first reverse bias element and the second photo detector is coupled to a second reverse bias element.

17. The optical buffer of claim 15 further comprising:

a second optical switch for each different wavelength signal having an input coupled to the output of the second demultiplexer, a first output and a second output;

a third multiplexer coupled to the first output of the second optical switch;

a delay fiber optic loop having a first end coupled to the second output of the second optical switch and a second end coupled to the second demultiplexer.

18. The optical buffer of claim 15 further comprising an optical amplifier having an input coupled to the second output of the second optical switch and an output coupled to the first end of the delay fiber optic loop.

19. The optical buffer of claim 17 further comprising:

a wavelength converter having an input coupled to the output of the code detector and an output optically coupled to the third multiplexer, the converter modulating the signal at a reserved wavelength;

a delay loop coupled to the output of the second demultiplexer at the reserved wavelength; and a second wavelength converter having an input coupled to the delay loop, and an output coupled to the first end of the fiber optic delay loop.

20. The optical buffer of claim 17 wherein the second optical switch is an optical amplifier controlled by the processor to reshape and recondition the signal.

21. The optical buffer of claim 18 wherein the optical amplifier is an erbium doped optical amplifier.

22. The optical buffer of claim 18 wherein the optical amplifier reshapes and reconditions the signal.

23. The optical buffer of claim 18 further comprising:

a third optical switch having an input coupled to the second output of the second optical switch, and a first output coupled to the input of the amplifier and a second output coupled to the first end of the delay fiber optics loop, and the switch is coupled to the processor;

wherein the signal is diverted to the delay fiber optics loop by the processor when the signal is not amplified.

* * * * *